United States Patent
Jung et al.

(10) Patent No.: US 12,537,244 B2
(45) Date of Patent: Jan. 27, 2026

(54) POWER SUPPLY DEVICE HAVING SIDE REINFORCEMENT FRAME

(71) Applicant: Samsung SDI Co., Ltd., Yongin-si (KR)

(72) Inventors: Sunghoon Jung, Yongin-si (KR); Heonhee Kim, Yongin-si (KR); Daeyeop Park, Yongin-si (KR); Junhyung Lee, Yongin-si (KR); Jisoon Lim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 146 days.

(21) Appl. No.: 17/566,519

(22) Filed: Dec. 30, 2021

(65) Prior Publication Data
US 2022/0209329 A1    Jun. 30, 2022

(30) Foreign Application Priority Data

Dec. 31, 2020  (KR) .................. 10-2020-0189842
Dec. 30, 2021  (KR) .................. 10-2021-0192906

(51) Int. Cl.
*H01M 10/6556* (2014.01)
*H01M 10/6554* (2014.01)

(52) U.S. Cl.
CPC ... *H01M 10/6556* (2015.04); *H01M 10/6554* (2015.04)

(58) Field of Classification Search
CPC ................ H01M 10/6556; H01M 10/6554
See application file for complete search history.

(56) References Cited

U.S. PATENT DOCUMENTS

| | | | |
|---|---|---|---|
| 10,763,475 B2 | 9/2020 | Krenzer et al. | |
| 11,482,742 B2 | 10/2022 | Ogino et al. | |
| 2012/0103714 A1 | 5/2012 | Choi et al. | |
| 2013/0266840 A1 | 10/2013 | Fujil et al. | |
| 2014/0014428 A1* | 1/2014 | Yanagi | B60K 1/04 |
| | | | 180/68.5 |
| 2016/0036102 A1 | 2/2016 | Suzuki et al. | |
| 2017/0346146 A1* | 11/2017 | Kim | H01M 50/271 |
| 2018/0154754 A1* | 6/2018 | Rowley | B60K 1/04 |
| 2019/0074494 A1 | 3/2019 | Krenzer et al. | |
| 2020/0398652 A1 | 12/2020 | Stephens et al. | |

(Continued)

FOREIGN PATENT DOCUMENTS

| | | |
|---|---|---|
| CN | 109449329 A | 3/2019 |
| CN | 110959224 A | 4/2020 |
| KR | 10-0757131 B1 | 9/2007 |

(Continued)

OTHER PUBLICATIONS

European Search Report for EP Application No. 21218477.4 dated May 24, 2022, 9 pages.

(Continued)

*Primary Examiner* — Jimmy Vo
(74) *Attorney, Agent, or Firm* — Womble Bond Dickinson (US) LLP

(57) ABSTRACT

A power supply device includes: a power supply unit including at least one battery module; and a side reinforcement frame on a side surface of the power supply unit and surrounding a refrigerant pipe connected to a cooling passage of the at least one battery module.

19 Claims, 15 Drawing Sheets

(56) References Cited

U.S. PATENT DOCUMENTS

2021/0119282 A1    4/2021    Wuensche et al.
2021/0351455 A1   11/2021    Kim et al.

FOREIGN PATENT DOCUMENTS

| | | | | |
|---|---|---|---|---|
| KR | 10-2012-0044853 A | 5/2012 | | |
| KR | 10-2015-0121322 A | 10/2015 | | |
| KR | 10-2020-0033778 A | 3/2020 | | |
| WO | WO-2016131141 A1 * | 8/2016 | ........ | H01M 10/6568 |
| WO | WO-2019026676 A1 * | 2/2019 | ........ | H01M 10/6568 |
| WO | WO-2019221376 A1 * | 11/2019 | .............. | B60L 50/64 |

OTHER PUBLICATIONS

Chinese Office Action, with English translation, dated Dec. 25, 2023, issued in Chinese Patent Application No. 202111664368.4 (23 pages).
Chinese Office Action dated Aug. 21, 2024, issued in corresponding Chinese Patent Application No. 202111664368.4 (8 pages).
European Office Action dated Dec. 12, 2024, issued in corresponding European Patent Application No. 21218477.4, 4 pages.

* cited by examiner

POWER SUPPLY DEVICE HAVING SIDE REINFORCEMENT FRAME

CROSS-REFERENCE TO RELATED APPLICATION

The present application claims priority to and the benefit of Korean Patent Application No. 10-2020-0189842, filed on Dec. 31, 2020, and Korean Patent Application No. 10-2021-0192906, filed Dec. 30, 2021 in the Korean Intellectual Property Office, the entire contents of both of which are incorporated herein by reference.

BACKGROUND

1. Field

Aspects of one or more embodiments relate to a power supply device.

2. Description of the Related Art

In general, a secondary battery is a battery that is capable of being repeatedly charged and discharged without damaging the secondary battery, as opposed to a primary battery that is not capable of being recharged. Secondary batteries may be utilized as energy sources for various application, such as mobile devices, electric vehicles, hybrid vehicles, electric bicycles, uninterruptible power supplies, and the like. Secondary batteries may be utilized in the form of a single battery depending on the type of external device to which the secondary battery is applied, and may also be used in the form of a pack in which a plurality of batteries are connected and bundled as a unit.

Small mobile devices such as cell phones may be operated for a certain period of time with the output and capacity of a single battery. However, larger-sized mobile devices such as laptops or electric vehicles or hybrid vehicles that consume a relatively large amount of power may also require a relatively long-term operation period and also relatively high-power during operation. In this case, a pack type including a plurality of batteries may be utilized due to the benefits of relatively high output and capacity, and the output voltage or output current of a pack may be increased according to the number of batteries in the pack.

The above information disclosed in this Background section is only for enhancement of understanding of the background and therefore the information discussed in this Background section does not necessarily constitute prior art.

SUMMARY

Aspects of one or more embodiments include a power supply device that has relatively improved impact resistance against external impacts and may have a relatively low weight by using a module housing including a composite material.

Additional aspects will be set forth in part in the description which follows and, in part, will be apparent from the description, or may be learned by practice of the presented embodiments of the disclosure.

According to some embodiments, a power supply device includes: a power supply unit including at least one battery module, and a side reinforcement frame arranged on a side surface of the power supply unit and surrounding a refrigerant pipe connected to a cooling passage of the at least one battery module.

According to some embodiments, the at least one battery module may include at least one cell assembly, a main housing including a main rim portion surrounding an accommodation space in which the at least one cell assembly is accommodated, a first plate including a first rim portion coupled to the main rim portion and a first exposed portion exposed from the main rim portion and defining one side of the cooling passage for cooling the accommodation space, and a second plate arranged to face the first plate and including a second rim portion coupled to the main rim portion and a second exposed portion exposed from the main rim portion and defining the other side of the cooling passage.

According to some embodiments, the power supply unit may include a plurality of battery modules each extending in a first direction and arranged in a second direction, and the side reinforcement frame may extend across front and rear surfaces of the plurality of battery modules arranged in the second direction.

According to some embodiments, the cooling passage may extend in the first direction in which the front surfaces of the plurality of battery modules face the rear surfaces of the plurality of battery modules.

According to some embodiments, the refrigerant pipe may extend in the second direction, and may be branched in the first direction and supply a cooling medium to a plurality of cooling passages or retrieve the cooling medium from the plurality of cooling passages.

According to some embodiments, the side reinforcement frame may include an inner frame arranged to face the side surface of the power supply unit, an outer frame arranged opposite to the side surface of the power supply unit in the first direction, and a connection bar connecting the inner frame to the outer frame.

According to some embodiments, each of the inner frame and the outer frame may include a flat portion arranged parallel to the side surface of the power supply unit.

According to some embodiments, the connection bar may include a first connection bar extending between the flat portion of the inner frame and the flat portion of the outer frame.

According to some embodiments, the first connection bar may include a first outer connection bar connecting an end of the inner frame to an end of the outer frame and forming a closed cross-section of the side reinforcement frame, and a first inner connection bar formed inside the closed cross-section of the side reinforcement frame.

According to some embodiments, the inner frame may include a flat portion extending parallel to the side surface of the power supply unit, and a curved portion protruding roundly from the flat portion in the first direction away from the side surface of the power supply unit.

According to some embodiments, the curved portion may surround the refrigerant pipe formed on the side surface of the power supply unit.

According to some embodiments, the curved portion may be arranged between flat portions formed on both sides of the curved portion in a third direction intersecting with the first direction.

According to some embodiments, the flat portions formed on both sides of the curved portion may provide a binding position for coupling between the side reinforcement frame and the power supply unit.

According to some embodiments, the connection bar may include a second connection bar extending between the curved portion of the inner frame and the flat portion of the outer frame.

According to some embodiments, the second connection bar may be connected to a convex apex farthest from the side surface of the power supply unit in the first direction in the curved portion of the inner frame.

According to some embodiments, the outer frame may include a flat portion extending parallel to the side surface of the power supply unit, and a protrusion protruding from the flat portion in the first direction away from the side surface of the power supply unit.

According to some embodiments, the protrusion may be formed between flat portions formed at both sides of the outer frame in a third direction intersecting with the first direction.

According to some embodiments, the protrusion may include a pair of protrusion pieces extending in parallel in the first direction, and a connection piece extending in a third direction intersecting with the first direction and connecting the pair of protrusion pieces to each other.

According to some embodiments, the connection piece may include an outer connection piece connecting ends of the pair of protrusion pieces to each other to form a closed cross-section of the side reinforcement frame, and an inner connection piece formed inside the closed cross-section of the side reinforcement frame.

According to some embodiments, a fastening hole may be formed in a pair of protrusion pieces, which are formed between the outer connection piece and the inner connection piece, in the third direction intersecting with the first direction.

BRIEF DESCRIPTION OF THE DRAWINGS

The above and other aspects, features, and characteristics of certain embodiments of the disclosure will be more apparent from the following description taken in conjunction with the accompanying drawings, in which.

DETAILED DESCRIPTION

Figure 1:
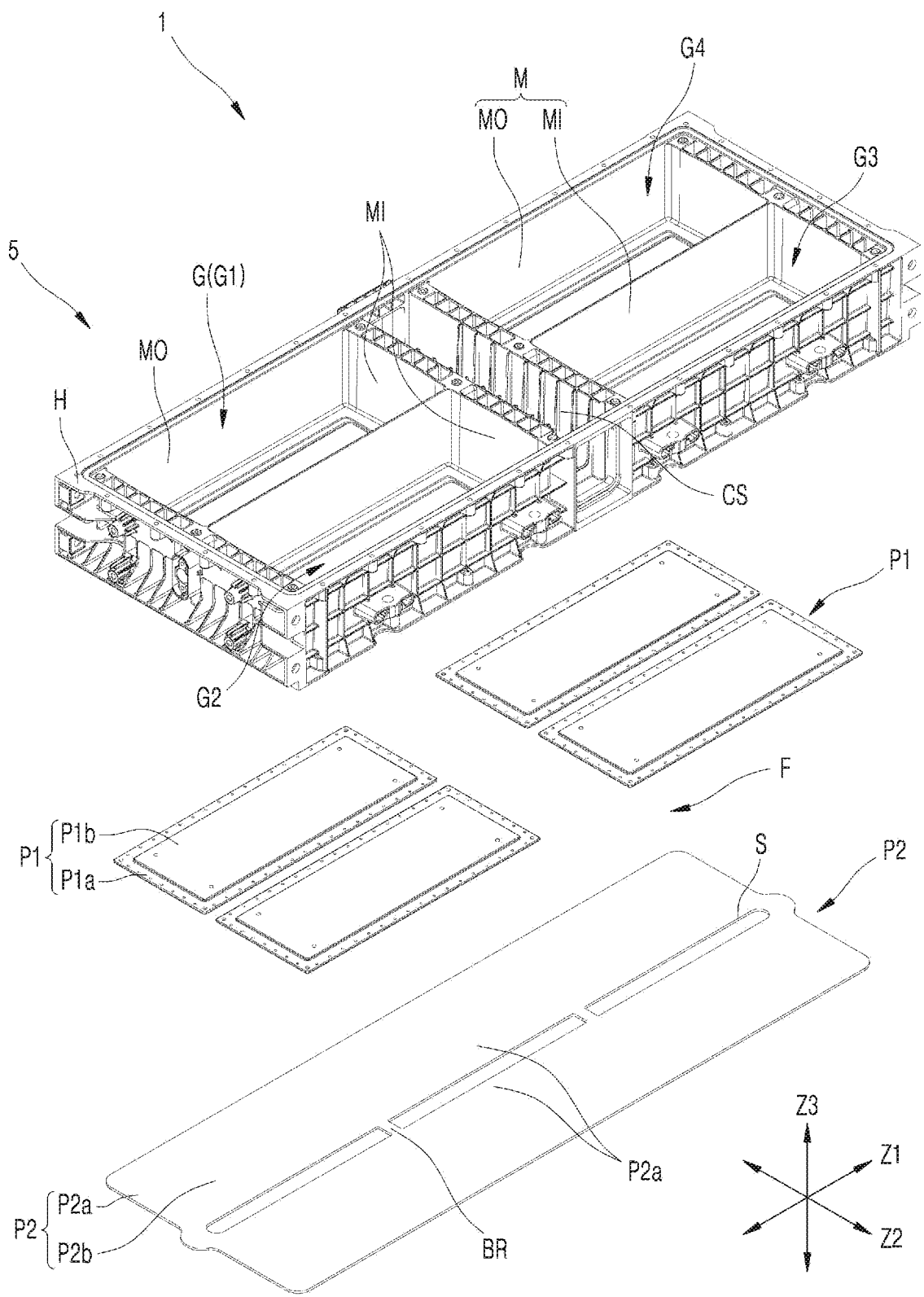
FIG. 1 is an exploded perspective view of a battery module according to some embodiments.

Reference will now be made in more detail to aspects of some embodiments, which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, aspects of a power supply device according to some embodiments will be described in more detail with reference to the accompanying drawings.

A power supply device according to some embodiments may include a power supply unit including a plurality of battery modules to supply driving power to a set device such as a vehicle. Hereinafter, aspects of a battery module will be first described, and then a power supply unit including a plurality of battery modules and a power supply device including the power supply unit will be described.

Figure 2:
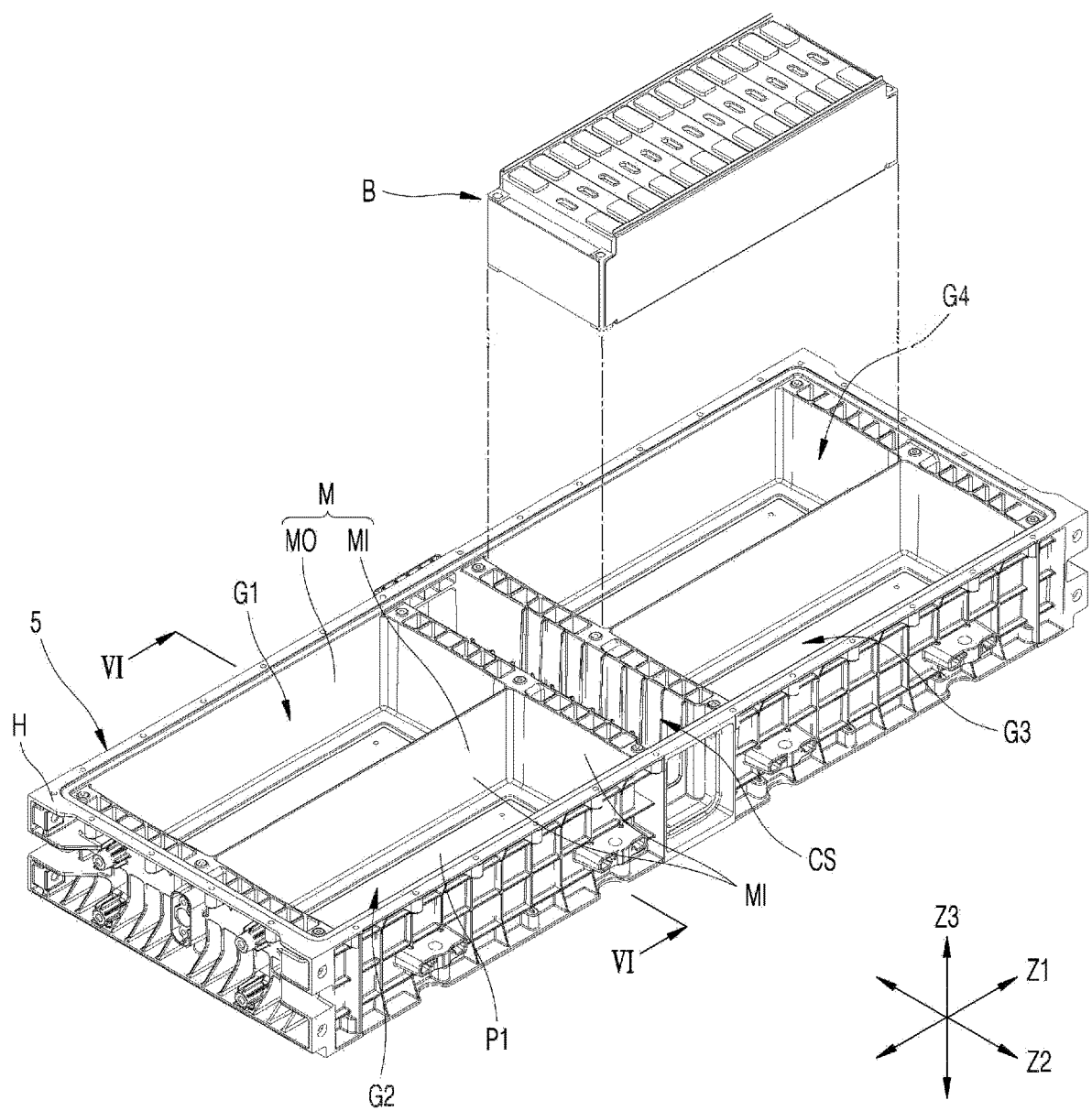
FIG. 2 is a perspective view of a module housing shown in FIG. 1.
Figure 3:
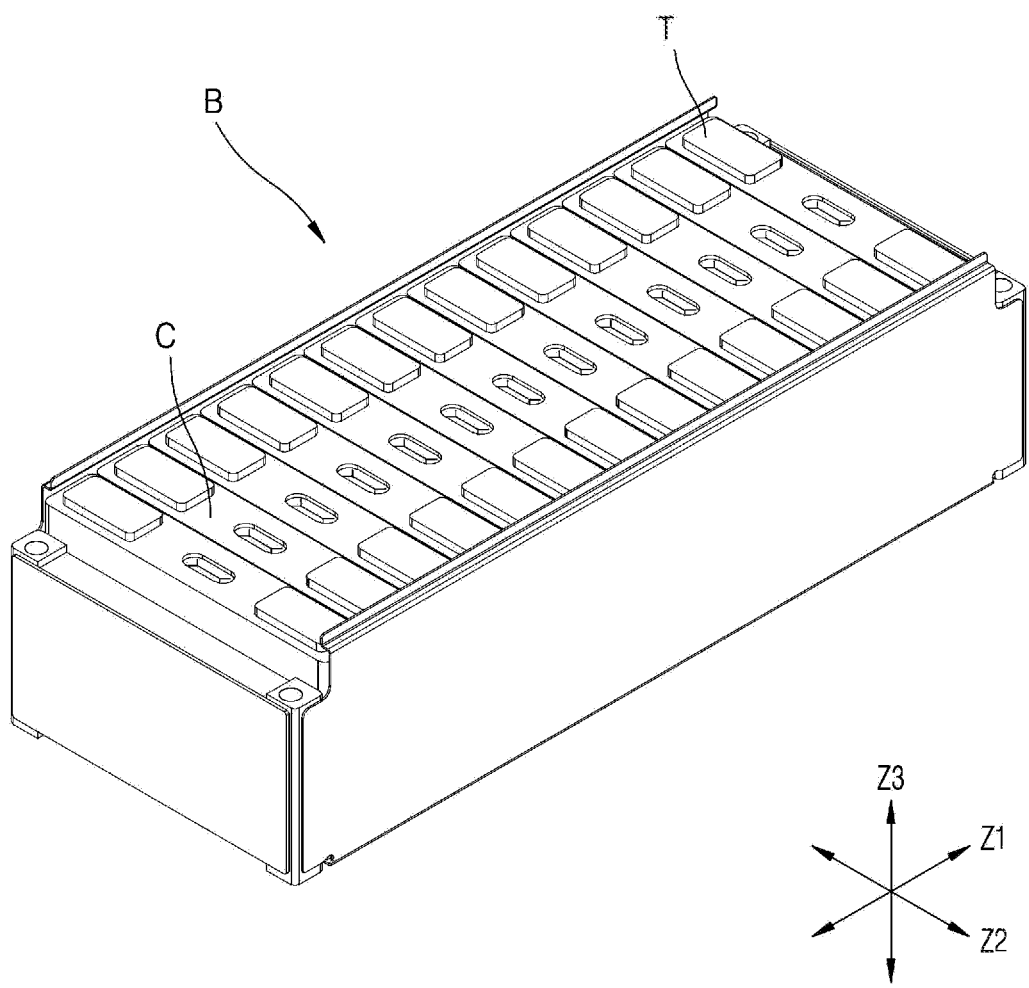
FIG. 3 is a perspective view of a cell assembly shown in FIG. 1.
Figure 4:
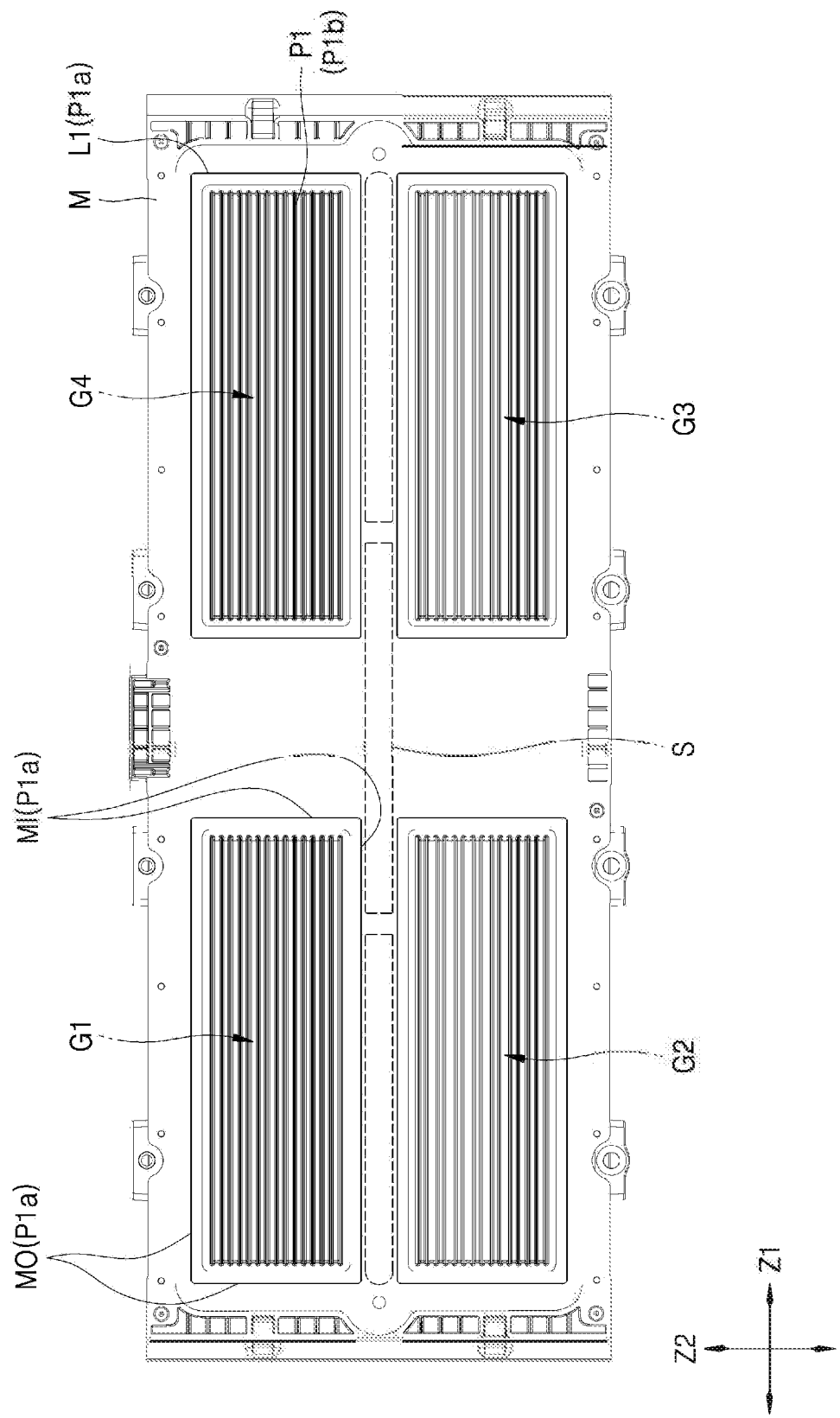
FIG. 4 is a view illustrating a first coupling line for coupling a first plate shown in FIG. 1.
Figure 5:
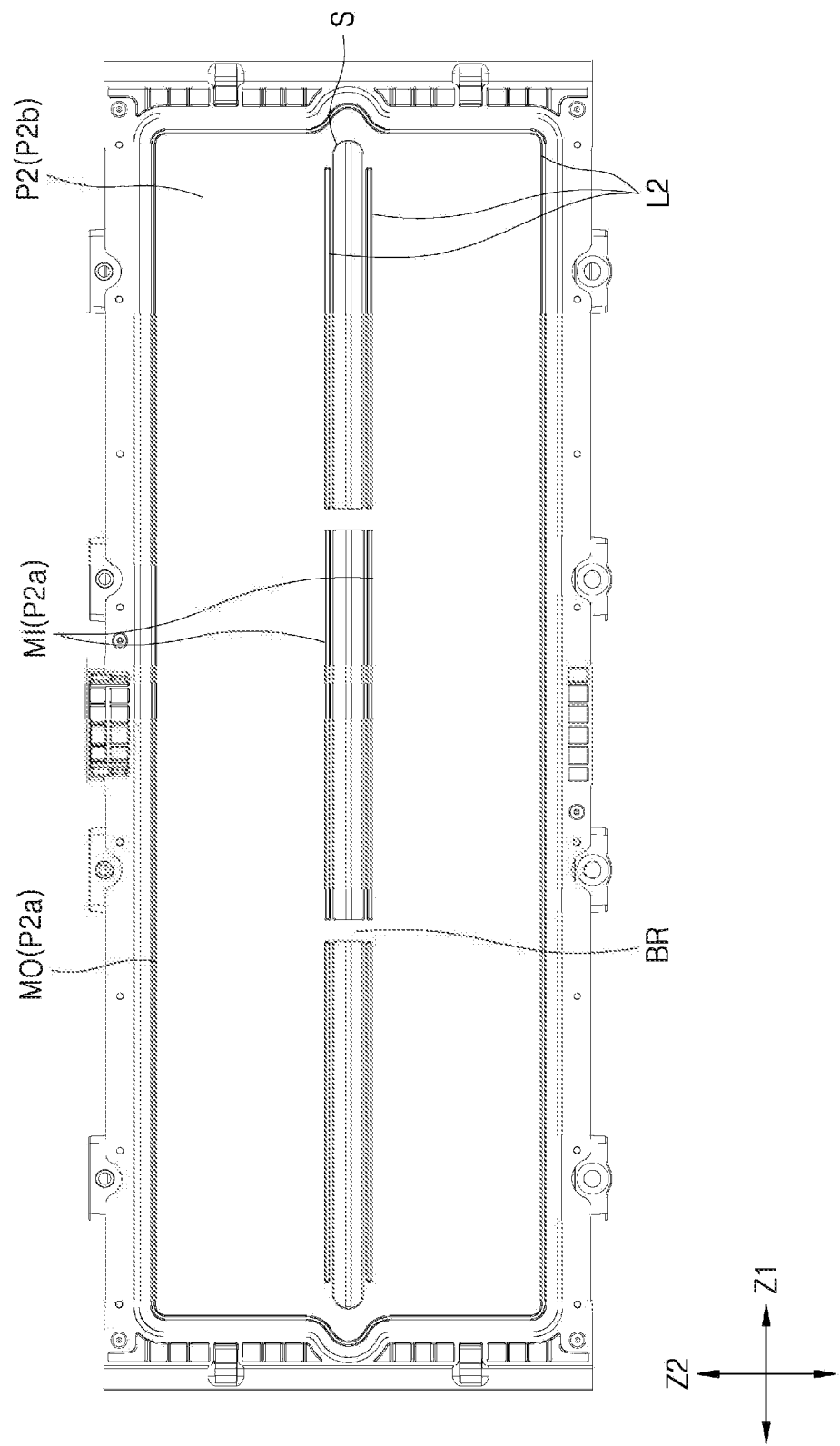
FIG. 5 is a view illustrating a second coupling line for coupling a second plate shown in FIG. 1.
Figure 6:
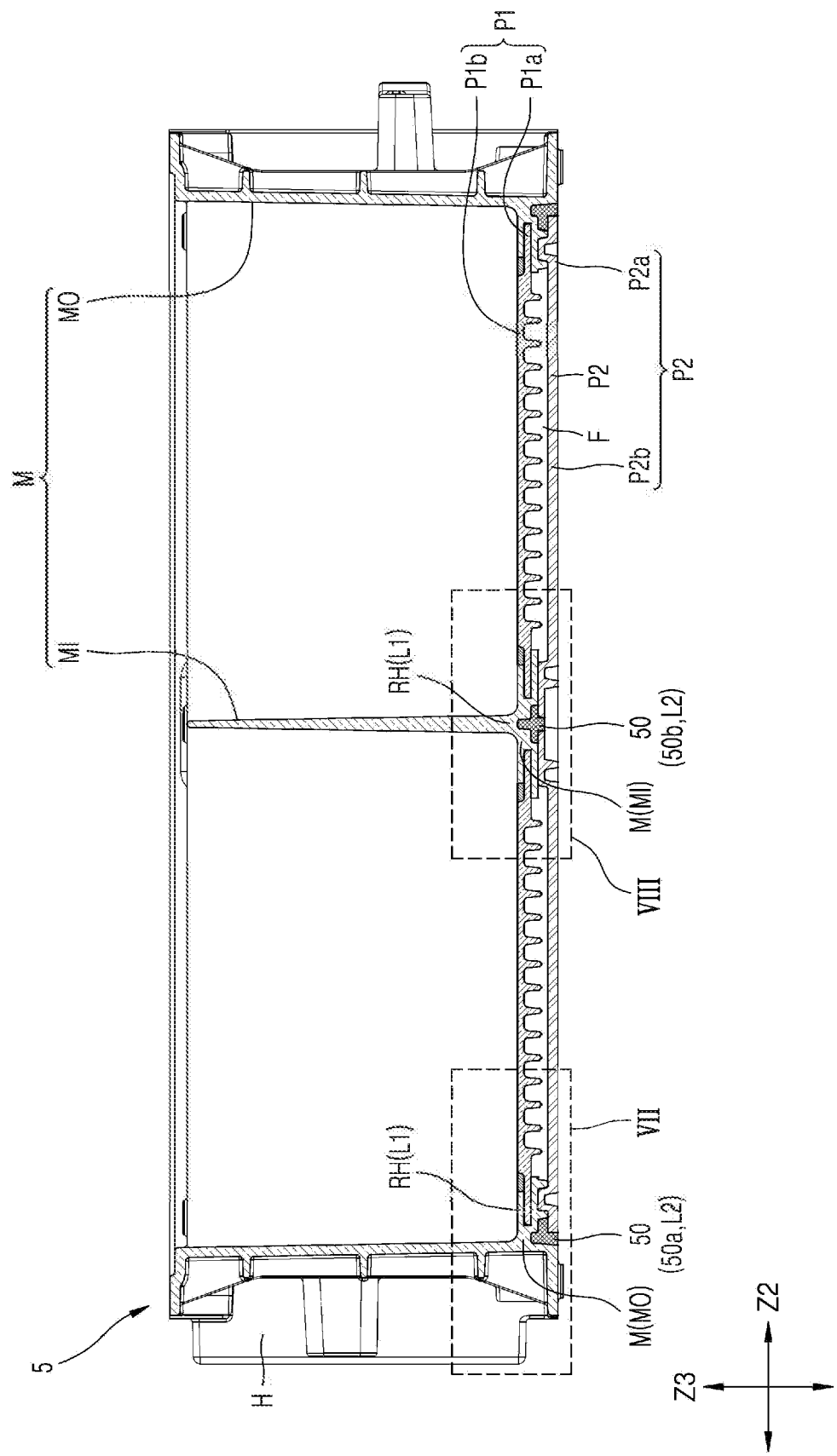
FIG. 6 is a cross-sectional view of the module housing taken along the line VI-VI of FIG. 2.
Figure 7:
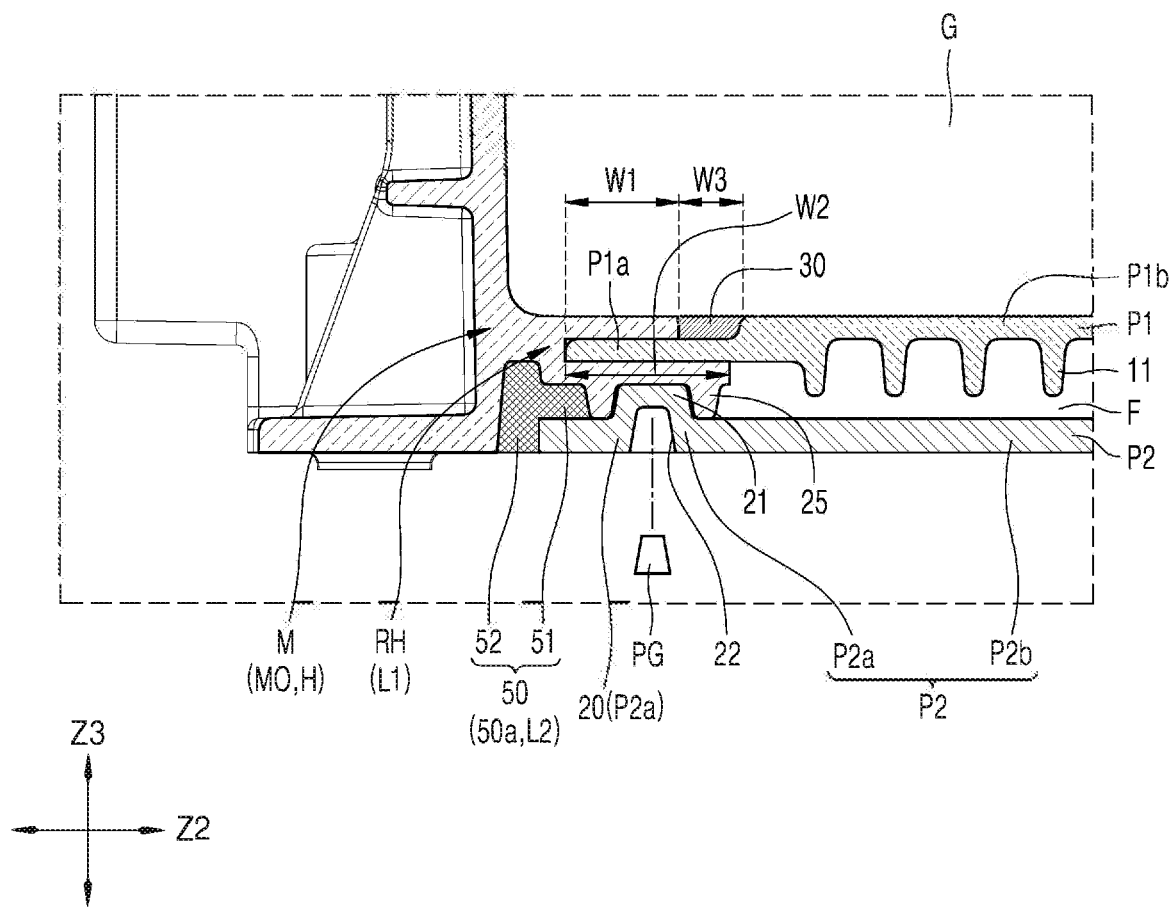
FIG. 7 is an enlarged cross-sectional view of a region VII of FIG. 6.
Figure 8:
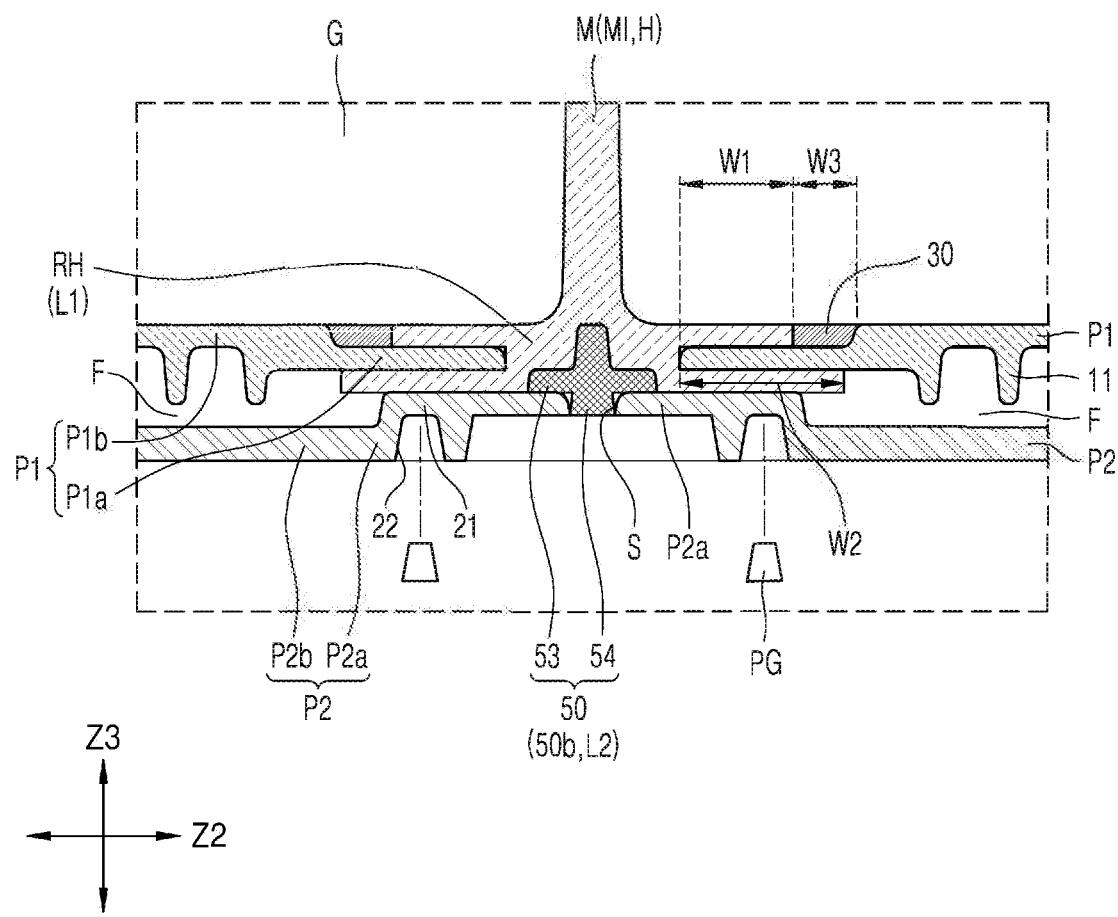
FIG. 8 is an enlarged cross-sectional view of a region VIII of FIG. 6.

FIG. 1 is an exploded perspective view of a battery module 1 according to some embodiments. FIG. 2 is a perspective view of a module housing shown in FIG. 1. FIG. 3 is a perspective view of a cell assembly shown in FIG. 1. FIG. 4 is a view illustrating a first coupling line for coupling a first plate shown in FIG. 1. FIG. 5 is a view illustrating a second coupling line for coupling a second plate shown in FIG. 1. FIG. 6 is a cross-sectional view of the module housing taken along the line VI-VI of FIG. 2. FIG. 7 is an enlarged cross-sectional view of a region VII of FIG. 6. FIG. 8 is an enlarged cross-sectional view of a region VIII of FIG. 6.

Referring to FIGS. 1 to 6, the battery module 1 may include one or more cell assemblies or cell stacks B, and a module housing 5 in which the cell assemblies B are accommodated. The module housing 5 may include a main housing H, a first plate P1, and a second plate P2. The main housing H includes a main rim portion M surrounding an accommodation space G in which the cell assemblies B may be positioned. The first plate P1 includes a first rim portion P1a coupled to the main rim portion M, and a first exposed portion P1b exposed from the main rim portion M and defining one side of a cooling passage F for cooling the accommodation space G. The second plate P2 is arranged to face the first plate P1 and includes a second rim portion P2a coupled to the main rim portion M, and a second exposed portion P2b exposed from the main rim portion M and defining the other side of the cooling passage F.

The main housing H, which forms the accommodation space G for the cell assemblies B, may form, by partition, a plurality of accommodation spaces G for accommodating different cell assemblies B, and may include a main rim portion M surrounding each of the plurality of accommodation spaces G. According to some embodiments, the main housing H may include first to fourth accommodation spaces G1, G2, G3, and G4 for accommodating different cell assemblies B, respectively, and the main rim portion M may surround each of the first to fourth accommodation spaces G1, G2, G3, and G4 that are different from each other.

According to some embodiments, the main rim portion M may further form, by partition, a circuit space CS for accommodating a circuit portion between adjacent accommodation spaces G while surrounding each of different accommodation spaces G. For example, according to some embodiments, the circuit space CS may be formed between a first accommodation space G1 and a fourth accommodation space G4 adjacent to each other in a first direction Z1 and between a second accommodation space G2 and a third accommodation space G3 adjacent to each other in the first direction Z1. Herein, the first direction Z1 may correspond to a longitudinal direction of the cell assembly B or a longitudinal direction of the accommodation space G in which the cell assembly B is accommodated, and may correspond to one direction in which a plurality of battery cells C are arranged, in the cell assembly B including the plurality of battery cells C arranged in one direction.

The main housing H may include a main rim portion M surrounding the accommodation space G for accommodating the cell assembly B. According to some embodiments, the main rim portion M may denote a wall of the main housing H formed along the circumference of the cell assembly B. According to some embodiments, the main rim portion M may denote a wall surrounding the accommodation space G formed in a rectangular parallelepiped shape to surround the cell assembly B substantially having a shape of a rectangular parallelepiped. In this case, the wall forming the main rim portion M may denote a wall facing each side portion of each of the front, rear, and side surfaces of the cell assembly B except the upper and lower surfaces of the cell assembly B. The wall forming the main rim portion M may include not only a portion facing each side portion of the cell assembly B, but also a portion facing a portion of a lower surface connected to each side portion of the cell assembly B, and may include a wall that extends from a wall facing each side portion of the cell assembly B and faces the lower surface (e.g., a portion of the lower surface) of the cell assembly B. According to some embodiments, the side portion of the cell assembly B may denote a side portion connecting the upper surface and the lower surface of the cell assembly B to each other, minus the upper surface from which an electrode terminal T (refer to FIG. 3) of the cell assembly B protrudes and the lower surface of the cell assembly B opposite to the upper surface thereof, and the main rim portion M may form an accommodation space G for the cell assembly B while surrounding each side portion of the cell assembly B. As described above, the main rim portion M may extend to face a portion of a lower surface connected to the side portion of the cell assembly B while mainly facing the side portion of the cell assembly B.

The main rim portion M may include a main inner rim portion MI formed between adjacent accommodation spaces G, and a main outer rim portion MO that crosses the adjacent accommodation spaces G and surrounds the adjacent accommodation spaces G as a whole. The main outer rim portion MO may be formed along the outside of the main housing H, and the main inner rim portion MI may be formed inside the main housing H.

The main inner rim portion MI may be formed between the first accommodation space G1 and the second accommodation space G2 adjacent to each other in a second direction Z2, between the third accommodation space G3 and the fourth accommodation space G4 adjacent to each other in the second direction Z2, between the first accommodation space G1 and the fourth accommodation space G4 adjacent to each other in the first direction Z1, and between the second accommodation space G2 and the third accommodation space G3 adjacent to each other in the first direction Z1. In this case, the first direction Z1 may correspond to a longitudinal direction of the cell assembly B or a longitudinal direction of the accommodation space G in which the cell assembly B is accommodated, and the second direction Z2 may be a direction intersecting with the first direction Z1 and may correspond to a width direction of the cell assembly B or a width direction of the accommodation space G in which the cell assembly B is accommodated.

The main inner rim portion MI may be formed as a single wall between the first accommodation space G1 and the second accommodation space G2 adjacent to each other in the second direction Z2 and between the third accommodation space G3 and the fourth accommodation space G4 adjacent to each other in the second direction Z2, and may be formed as a double wall between the first accommodation space G1 and the fourth accommodation space G4 adjacent to each other in the first direction Z1 and between the second accommodation space G2 and the third accommodation space G3 adjacent to each other in the first direction Z1. According to some embodiments, the double wall between the first accommodation space G1 and the fourth accommodation space G4 may be arranged with a circuit space CS therebetween, and similarly, the double wall between the second accommodation space G2 and the third accommodation space G3 may be arranged with the circuit space CS therebetween. For example, the circuit space CS may be formed as one space between the first accommodation space G1 and the fourth accommodation space G4 and between the second accommodation space G2 and the third accommodation space G3. According to some embodiments, a circuit portion electrically connected to a plurality of cell assemblies B may be arranged in the circuit space CS. According to some embodiments, a circuit portion electrically connected to a plurality of cell assemblies B, for example, a configuration such as a bus bar for electrically connecting a plurality of cell assemblies B to each other may be arranged in the circuit space CS. According to some embodiments, the main inner rim portion MI may denote an inner wall of the main housing H arranged between spaces formed by partition of the main housing H, that is, between the first to fourth accommodation spaces G1, G2, G3, and G4 adjacent to each other and the circuit space CS. Herein, with respect to the main inner rim portion MI formed as a double wall between the first accommodation space G1 and the fourth accommodation space G4 in the first direction Z1 and between the second accommodation space G2 and the third accommodation space G3 in the first direction Z1, each single wall may be referred to as a main inner rim portion MI, or the double wall may be collectively referred to as a main inner rim portion MI.

The main outer rim portion MO may denote an outer wall forming the main housing H, or may denote a wall surrounding the first to fourth accommodation spaces G1, G2, G3, and G4 and the circuit space CS, formed by partition of the main housing H, as a whole. According to some embodiments, the main outer rim portion MO may correspond to an outer wall of the main housing H, which extends across the first to fourth accommodation spaces G1, G2, G3, and G4 adjacent to each other and surrounds the first to fourth accommodation spaces G1, G2, G3, and G4 as a whole.

According to some embodiments, each of the first to fourth accommodation spaces G1, G2, G3, and G4 may be surrounded by a combination of the main outer rim portion MO and the main inner rim portion MI. For example, a main outer rim portion MO having a bent shape and a main inner rim portion MI having a bent shape, which are formed at positions facing each other in a diagonal direction crossing each accommodation space G, may contact each other, and thus, each of the first to fourth accommodation spaces G1, G2, G3, and G4 may be formed by partition. The first plate P1 formed individually for each of the first to fourth accommodation spaces G1, G2, G3, and G4 may form a coupling line with each of the main outer rim portion MO having a bent shape and the main inner rim portion MI having a bent shape, which are formed at positions facing each other in a diagonal direction crossing each accommodation space G. For example, the first plate P1 formed in the first accommodation space G1 may form a coupling line with each of the main outer rim portion MO having a bent shape and the main inner rim portion MI having a bent shape, which are formed at positions facing each other in a diagonal direction crossing the first accommodation space G1. As described below, the first plate P1 may form a first coupling line L1 by a recessed holding portion RH with each of the main outer rim portion MO and the main inner rim portion MI.

Herein, the first coupling line L1 may denote a coupling line for fixing the position of the first plate P1 by the recessed holding portion RH (refer to FIGS. 7 and 8). In this case, the recessed holding portion RH may fix the position of the first plate P1 while continuously surrounding the upper surface, the lower surface, and the side surface of the first rim portion P1a formed along the edge of the first plate P1. The technical details regarding the recessed holding portion RH are described in more detail below.

According to some embodiments, the second plate P2 formed in common with respect to the entire accommodation space G may form a second coupling line L2 with the main outer rim portion MO. For example, the second plate P2 may form a second coupling line L2 by a sealing portion 50 (refer to FIGS. 7 and 8) arranged between the second plate P2 and the main outer rim portion MO. Herein, the second coupling line L2 may denote a coupling line for fixing the position of the second plate P2 through the sealing portion 50. The sealing portion 50 may be arranged between the second rim portion P2a formed along the edge of the second plate P2 and the main outer rim portion MO to mediate the coupling therebetween. Technical details regarding the sealing portion 50 are described in more detail below.

Herein, the edge of the second plate P2 is a portion formed along the outer side of the second plate P2, and the periphery of an elongated slot S formed in the inner side of the second plate P2 may not correspond to the edge of the second plate P2. As described below, the second rim portion P2a formed in the second plate P2 may include a second rim portion P2a formed along the edge of the second plate P2, and a second rim portion P2a formed along the periphery of the elongated slot S formed in the inner side of the second plate P2, but the periphery of the elongated slot S formed in the inner side of the second plate P2 may not correspond to the edge of the second plate P2.

According to some embodiments, the second plate P2 may form a second coupling line L2 with the main outer rim portion MO and may also form a second coupling line L2 with the main inner rim portion MI. The second plate P2 may be formed in common with respect to the entire accommodation space G and form a common base for the entire accommodation space G, and may form the second coupling line L2 with the main outer rim portion MO. According to some embodiments, in order to increase the position fixing force of the second plate P2, the elongated slot S may be formed in the second plate P2, and the second coupling line L2 may also be formed along the second rim portion P2a around the elongated slot S. That is, the second coupling line L2 may include a second coupling line L2 forming a coupling with the main outer rim portion MO along the edge of the second plate P2, and a second coupling line L2 forming a coupling with the main inner rim portion MI along the periphery of the elongated slot S. According to some embodiments, the elongated slot S may be formed in the first direction Z1, and may be formed to be long along the main inner rim portion MI to form the second coupling line L2 with the main inner rim portion MI.

The elongated slot S may extend in the first direction Z1 along the main inner rim portion MI and may also extend between the first and second accommodation spaces G1 and G2 adjacent to each other and the third and fourth accommodation spaces G3 and G4 adjacent to each other. According to some embodiments, the elongated slot S may include a plurality of elongated slots S that are apart from each other in the first direction Z1. For example, the elongated slot S may include three elongated slots S that are apart from each other. In this case, a bridge BR (refer to FIG. 1) may be formed between elongated slots S adjacent to each other in the first direction Z1.

Because the second plate P2 has a large area over the entire region of the module housing 5 to entirely cover the first to fourth accommodation spaces G1, G2, G3, and G4, the rigidity of the second plate P2 may be maintained through the bridge BR formed between elongated slots S adjacent to each other. The bridge BR may be formed between the adjacent elongated slots S so that the second plate P2 is not folded against an external impact applied in the second direction Z2 intersecting with the first direction Z1. Accordingly, the elongated slot S extending in the first direction Z1 may include a plurality of elongated slots S that are disconnected by the bridge BR and spaced apart from each other in the first direction Z1.

According to some embodiments, the first plate P1 forms the bottom of the accommodation space G in which the cell assembly B is accommodated, and forms the cooling passage F for cooling the lower surface of the cell assembly B facing the bottom of the accommodation space G. The first plate P1 may be individually formed for each accommodation space G, and may not be formed in the circuit space CS other than the accommodation space G in which the cell assembly B is positioned. Accordingly, the first plate P1 does not form a bottom in the circuit space CS, and the main housing H surrounding the first plate P1 may form the bottom of the circuit space CS. For example, according to some embodiments, the first plate P1 may form the bottom of each of the first to fourth accommodation spaces G1, G2, G3, and G4 while closing an opening formed in the main housing H to correspond to each of the first to fourth accommodation spaces G1, G2, G3, and G4, and in the circuit space CS, a bottom thereof may be formed by the main housing H between openings corresponding to the first to fourth accommodation spaces G1, G2, G3, and G4.

The second coupling line L2 may be formed along a second rim portion P2a formed at the edge of the second plate P2 and a second rim portion P2a formed around the elongated slot S. The second rim portion P2a formed on the edge of the second plate P2 forms a second coupling line L2 with the main outer rim portion MO, and the second rim portion P2a formed around the elongated slot S forms a second coupling line L2 with the main inner rim portion MI, and thus, a position fixing force of the second plate P2 may be increased through the second coupling line L2 formed in the inner and outer sides of the second plate P2. In this case, the second coupling line L2 may form a coupling with a second rim portion P2a formed at the edge of the second plate P2, and may also form a coupling with a second rim portion P2a formed around the elongated slot S. In this case, the second coupling line L2 formed along the edge of the second plate P2 may be formed to have a closed loop shape while surrounding the edge of the second plate P2, and the second coupling line L2 formed around the elongated slot S may be formed to have a stripe shape along a elongated slot S extending long along the main inner rim portion MI. As such, the second coupling line L2 may be formed along the periphery of the elongated slot S of the second plate P2 while being formed along the edge of the second plate P2. In this case, the second coupling line L2 formed along the edge of the plate P2 and the second coupling line L2 formed along the periphery of the elongated slot S of the second plate P2 may have different cross-sectional structures. For example, on a cross-section taken in the second direction Z2, the cross-sectional structure of the second coupling line L2 (or a sealing portion 50 (refer to FIG. 7) forming the second coupling line L2) formed at the edge of the second plate P2 may be different from the cross-sectional structure of the second coupling line L2 (or a sealing portion 50 (refer to FIG. 8) forming the second coupling line L2) formed around the elongated slot S of the second plate P2. This is because the second coupling line L2 (or the sealing portion 50 (refer to FIG. 7)) formed along the edge of the second plate P2 forms a coupling with one second rim portion P2a formed at the edge of the second plate P2, but the second coupling line L2 (or the sealing portion 50 (refer to FIG. 8)) formed along the periphery of the elongated slot S of the second plate P2 forms a coupling with two second rim portions P2a formed on both sides of the elongated slot S. For example, the second coupling line L2 (or the sealing portion 50 (refer to FIG. 7)) formed along the edge of the second plate P2 may have an asymmetrical cross-sectional structure while forming a coupling with one second rim portion P2a formed at the edge of the second plate P2, and the second coupling line L2 (or the sealing portion 50 (refer to FIG. 8)) formed along the periphery of the elongated slot S of the second plate P2 may have a symmetrical cross-sectional structure while forming a coupling with two second rim portions P2a formed on both sides of the elongated slot S. The cross-sectional structure of the second coupling line L2 or the sealing portion 50 is described in more detail below. For reference, herein, as shown in FIG. 5, with respect to two second rim portions P2a formed on both sides of the elongated slot S, each of the two second rim portions P2a respectively formed on one side and the other side of the elongated slot S may be referred to as a second rim portion P2a, or the two second rim portions P2a formed on both sides of the elongated slot S may be collectively referred to as a second rim portion P2a.

The main housing H may include a main rim portion M surrounding each of different accommodation spaces G, and an opening surrounded by the main rim portion M. For example, the opening may be formed for each accommodation space G. The opening may be formed at the bottom of the accommodation space G corresponding to the lower surface of the cell assembly B, and the main rim portion M may be formed to surround the opening formed in each accommodation space G. In this case, the lower surface of the cell assembly B may mainly face the opening, and may also face a part of the main rim portion M surrounding the opening.

The opening of the main housing H may be closed by the first plate P1. For example, the first plate P1 may include a plurality of first plates P1 respectively arranged in the first to fourth accommodation spaces G1, G2, G3, and G4. That is, openings respectively formed in the first to fourth accommodation spaces G1, G2, G3, and G4 may be closed by a plurality of first plates P1 individually formed for the first to fourth accommodation spaces G1, G2, G3, and G4, and the plurality of first plates P1 may form the bottoms of the first to fourth accommodation spaces G1, G2, G3, and G4 and provide a support base that supports cell assemblies B respectively accommodated in the first to fourth accommodation spaces G1, G2, G3, and G4. The first plate P1 may form a first coupling line L1 while being coupled to the main rim portion M surrounding the openings to close the openings.

According to some embodiments, the first plate P1 may be coupled to the main rim portion M through the first coupling line L1. For example, the position of the first plate P1 may be fixed while the upper, lower, and side surfaces of the first rim portion P1a formed at the edge of the first plate P1 are consecutively surrounded through a recessed holding portion RH (refer to FIGS. 7 and 8) of the main rim portion M. According to some embodiments, the first rim portion P1a formed at the edge of the first plate P1 may be embedded in the main rim portion M, and may form the first coupling line L1 with the main rim portion M. For example, the first rim portion P1a of the first plate P1 may be covered by the main rim portion M and may not be exposed from the main rim portion M. In this case, at least the upper and lower surfaces of the first rim portion P1a may be covered by the main rim portion M and not be exposed from the main rim portion M. According to some embodiments, the upper and lower surfaces of the first rim portion P1a and the side surface connecting the upper surface and the lower surface to each other may be surrounded by the main rim portion M, and the main rim portion M may include a recessed holding portion RH having a concave shape, which consecutively surrounds the upper, lower, and side surfaces of the first rim portion P1a and accommodates the first rim portion P1a.

The first plate P1 may include a first rim portion P1a coupled to the main rim portion M, and a first exposed portion P1b exposed from the main rim portion M. In this case, the first exposed portion P1b may be exposed from the main rim portion M and be exposed to an accommodation space G surrounded by the main rim portion M. As described below, the first exposed portion P1b may form a cooling passage F for cooling a cell assembly B accommodated in the accommodation space G while being exposed toward the accommodation space G. That is, the first rim portion P1a of the first plate P1 may form a coupling with the main rim portion M, and the first exposed portion P1b of the first plate P1 may form a cooling passage F of the accommodation space G (the cell assembly B accommodated in the accommodation space G) surrounded by the main rim portion M while extending out of the main rim portion M. As described below, the cooling passage F may be formed between the first plate P1 forming the bottom of the accommodation space G and the second plate P2 arranged to face the first plate P1, and the first plate P1 may cool the cell assembly B while mediating heat transfer between the lower surface of the cell assembly B and the cooling passage F. According to some embodiments, the first plate P1 may include a metal material having excellent heat conduction characteristics, for example, an aluminum material, to promote heat transfer between the cell assembly B and the cooling passage F. According to some embodiments, the first plate P1 may include a metal material that is different from a resin material forming the main housing H, and the first plate P1 may be integrally formed with the main housing H through insert molding. In this case, the first plate P1 may be individually formed for each of the plurality of accommodation spaces G. In addition, as the first plate P1 is individually formed for adjacent accommodation spaces G, the first plate P1 may block thermal or electrical interference between different cell assemblies B accommodated in the adjacent accommodation spaces G. In this way, the first plate P1 individually formed for each of the plurality of accommodation spaces G may form a support base of the cell assembly B accommodated in each accommodation space G, and the position of the first plate P1 may be firmly fixed through the first coupling line L1 surrounding each accommodation space G. For example, the first coupling line L1 may be formed to have a closed loop shape surrounding each accommodation space G.

The second plate P2 may be arranged to face the first plate P1, and the cooling passage F may be formed between the second plate P1 and the first plate P1. For example, the first plate P1 and the second plate P2 may be arranged to face each other in a third direction Z3. The third direction Z3 may refer to a direction intersecting with the first and second directions Z1 and Z2. For example, the third direction Z3 may correspond to a height direction of the accommodation space G, which intersects with the first direction Z1 corresponding to a longitudinal direction of the accommodation space G and the second direction Z2 corresponding to a width direction of the accommodation space G. For example, the third direction Z3 may correspond to a height direction of the cell assembly B in which the upper surface of the cell assembly B and the lower surface thereof face each other.

The second plate P2 may be arranged at a lower position than the first plate P1, and similarly to the first plate P1, the position of the second plate P2 may be fixed through coupling with the main rim portion M. For example, the second plate P2 may include a second rim portion P2a coupled to the main rim portion M, and a second exposed portion P2b exposed from the main rim portion M. According to some embodiments, the second plate P2 may include a second rim portion P2a formed along the edge of the second plate P2, and a second rim portion P2a formed along the periphery of a elongated slot S of the second plate P2. The two second rim portions P2a may form a coupling with the main rim portion M with a sealing portion 50 (refer to FIGS. 7 and 8) therebetween, and may form a second coupling line L2.

The second plate P2 may be formed in common with respect to the entire accommodation space G, and may extend across a plurality of accommodation spaces G. In this case, the second plate P2 may form a coupling with the main outer rim portion MO through the second rim portion P2a formed at the edge of the second plate P2, and may also form a coupling with the main inner rim portion MI through the second rim portion P2a formed around the elongated slot S. That is, the second rim portion P2a of the second plate P2 may form a second coupling line L2 with the main outer rim portion MO and the main inner rim portion MI. In this way, the second rim portion P2a may form a coupling with the main rim portion M through the second coupling line L2, and the cross-sectional structure of the second coupling line L2 may differ between a second coupling line L2 (refer to FIG. 7) formed along the edge of the second plate P2 and a second coupling line L2 (refer to FIG. 8) formed along the periphery of the elongated slot S of the second plate P2. This is because the second coupling line L2 (refer to FIG. 7) formed along the edge of the second plate P2 forms a coupling with one second rim portion P2a formed at the edge of the second plate P2, whereas the second coupling line L2 (refer to FIG. 8) formed along the periphery of the elongated slot S of the second plate P2 forms a coupling with two second rim portions P2a formed on both sides of the elongated slot S based on the elongated slot S of the second plate P2. For example, the second coupling line L2 (refer to FIG. 7) formed along the edge of the second plate P2 may have an asymmetrical cross-sectional structure, and the second coupling line L2 (refer to FIG. 8) formed along the periphery of the elongated slot S of the second plate P2 may have a symmetrical cross-sectional structure. In this case, the cross-sectional structure may correspond to a cross-sectional structure taken across the second coupling line L2 in the second direction Z2 corresponding to the width direction of the accommodation space G.

The second plate P2 may form a cooling passage F together with the first plate P1. For example, the first plate P1 and the second plate P2 may be apart from each other in the third direction Z3 corresponding to the height direction of the accommodation space G, and may form a cooling passage F having a size corresponding to a gap between the first plate P1 and the second plate P2, which are apart from each other. Because the first plate P1 mediates heat transfer between the cell assembly B and the cooling passage F while in contact with the lower surface of the cell assembly B, the first plate P1 may include a metal material having excellent heat conduction characteristics. On the other hand, the second plate P2 may at least have thermal insulation characteristics rather than heat conduction characteristics to block heat transfer between the cooling passage F and the ground and prevent or reduce cold air from the cooling passage F being transferred to the ground. According to some embodiments, the second plate P2 may include a resin material, and may include the same resin material as the main housing H considering a coupling force between the second plate P2 and the main housing H. As described below, the second coupling line L2 that mediates the coupling between the second plate P2 and the main housing H is formed by the sealing portion 50 (refer to FIGS. 7 and 8) placed between the second plate P2 and the main housing H, and the sealing portion 50 may include the same resin material as the second plate P2 and the main housing H to be coupled to each other. Accordingly, the main housing H and the second plate P2, which include the same resin material, may be firmly coupled to each other with the sealing portion 50 therebetween, the sealing portion 50 including the same resin material as the main housing H and the second plate P2. However, the technical scope of the present disclosure is not limited thereto. For example, the main housing H and the second plate P2 may include a flame-retardant material, and the sealing portion 50 may not include a flame-retardant material. Unlike the main housing H and the second plate P2, the sealing portion 50 has a relatively small volume, and thus may not cause a problem in emergency situations such as fire or explosion even though the sealing portion 50 does not include a flame-retardant material. As described below, because the sealing portion 50 requires additional sealing characteristics while being formed at a position in contact with the outside, the sealing portion 50 may include a material that is different from that of the main housing H or the second plate P2.

The module housing 5 according to some embodiments may be formed by Die Slide Injection (DSI). For example, the main housing H and the first plate P1, which include different materials, may be integrally formed together through primary molding to which insert molding is applied, and then, through secondary molding, a sealing portion 50 for coupling a primary molding body, in which the main housing H and the first plate P1 are integrated, to the second plate P2 may be formed. For example, according to some embodiments, while the primary molding body, in which the main housing H and the first plate P1, formed of different materials through the primary molding, are integrated, is formed, the second plate P2 may be formed at the same time. In this case, forming the second plate P2 together with the primary molding body in which the main housing H and the first plate P1 are integrated through the primary molding may denote that, even though the primary molding body and the second plate P2 are formed through different molding jigs, a molding process may be simultaneously performed in different molding jigs arranged adjacent to each other. In addition, in the secondary molding performed after the primary molding, after the primary molding body and the second plate P2 are moved to be in contact with each other while molding jigs at adjacent positions are slid to be close to each other, the module housing 5 may be formed by a DSI method of injecting a sealing material between the primary molding body and the second plate P2. That is, the second plate P2 may be formed through the primary molding, and after the second plate P2 formed through the primary molding is slid to be in contact with the primary molding body, in which the main housing H and the first plate P1 are integrated, in the secondary molding following the primary molding, the module housing 5 may be completed while a sealing material is injected between the second plate P2 and the primary molding body. In this case, in the secondary molding in which the sealing material is injected, the second plate P2 needs to firmly maintain its original position so as to be in contact with the primary molding body while being stably supported on a molding jig. When the second plate P2 is out of position, a coupling position between the second plate P2 and the primary molding body may be disturbed, and leakage of the cooling passage F formed by the second plate P2 may occur. As described below, according to some embodiments, in order to stably maintain a coupling position of the second plate P2, a jig groove 22 (refer to FIGS. 7 and 8) may be formed in the second plate P2, and a pressing portion PG of a molding jig may be fitted into the jig groove 22 of the second plate P2 to firmly fix the coupling position of the second plate P2 and correctly maintain a coupling position between the second plate P2 and the primary molding body. Technical details regarding the jig groove 22 are described in more detail below.

Hereinafter, with reference to FIGS. 7 and 8, a cross-sectional structure of the first coupling line L1 that forms a coupling between the main housing H and the first plate P1, and a cross-sectional structure of the second coupling line L2 that forms a coupling between the main housing H and the second plate P2 are described. According to some embodiments, the cross-sectional structures of the first and second coupling lines L1 and L2 may correspond to cross-sectional structures of the first and second coupling lines L1 and L2, taken in the second direction Z2 corresponding to the width direction of the accommodation space G.

The first and second coupling lines L1 and L2 may respectively include first and second coupling lines L1 and L2 forming a coupling with the main outer rim portion MO, and first and second coupling lines L1 and L2 forming a coupling with the main inner rim portion MI. Hereinafter, cross-sectional structures of the first and second coupling lines L1 and L2 that form a coupling with the main outer rim portion MO will be first described, and then cross-sectional structures of the first and second coupling lines L1 and L2 that form a coupling with the main inner rim portion MI will be described.

For reference, in the following description, the main rim portion M is divided into a main outer rim portion MO and a main inner rim portion MI, but unless otherwise stated, technical details regarding the main outer rim portion MO may be equally applied to the main inner rim portion MI, and conversely, technical details regarding the main inner rim portion MI may be equally applied to the main outer rim portion MO.

Referring to FIG. 7, the first coupling line L1 may include a coupling between the main outer rim portion MO and the first rim portion P1a of the first plate P1. For example, the main outer rim portion MO may include a recessed holding portion RH that forms a coupling with the first rim portion P1a of the first plate P1. The recessed holding portion RH may be concavely formed to consecutively cover the upper surface, the lower surface, and the side surface of the first rim portion P1a, and may be formed to embed the first rim portion P1a. As such, the recessed holding portion RH may consecutively cover the upper surface, the lower surface, and the side surface of the first rim portion P1a to firmly fix the position of the first rim portion P1a. The recessed holding portion RH may be formed through insert molding or primary molding for integrally forming the first plate P1 and the main housing H.

The first plate P1 forms a cooling passage F together with the second plate P2, and when a coupling force between the first plate P1 and the main housing H decreases or a gap occurs therebetween, a high-pressure cooling medium flowing through the cooling passage F may leak. Accordingly, in the present disclosure, through the recessed holding portion RH formed concavely to consecutively cover the upper surface, the lower surface, and the side surface of the first rim portion P1a of the first plate P1, a contact area between the main outer rim portion MO and the first rim portion P1a may be increased, and a coupling strength of the first rim portion P1a may be increased.

The upper surface of the first rim portion P1a covered by the recessed holding portion RH may form the upper surface of the first plate P1 together with the upper surface of the first exposed portion P1b facing the accommodation space G. In addition, the lower surface of the first rim portion P1a covered by the recessed holding portion RH may form the lower surface of the first plate P1 together with the lower surface of the first exposed portion P1b facing the cooling passage F.

The recessed holding portion RH may include a region having an upper width W1, which covers the upper surface of the first rim portion P1a, and a region having a lower width W2, which covers the lower surface of the first rim portion P1a. According to some embodiments, the lower width W2 may be greater than the upper width W1, that is, the lower width W2 may be formed to be relatively wide in the second direction Z2. In this case, a region having a filling width W3 may be formed on the first rim portion P1a that is out of the region having the upper width W1 that is relatively narrow. According to some embodiments, the region having the filling width W3 may be formed from the first rim portion P1a, which is out of the region having the upper width W1, to a boundary with the first exposed portion P1b, and may be formed on the first rim portion P1a from the first rim portion P1a, which is out of the region having the upper width W1, to the boundary with the first exposed portion P1b. A filling material 30 may be formed in the region having the filling width W3, and the filling material 30 formed in the region having the filling width W3 may reinforce a coupling strength between the main outer rim portion MO and the first rim portion P1a. That is, the filling material 30 may reinforce a coupling strength between the main housing H including the main outer rim portion MO and the first plate P1 including the first rim portion P1a, thereby allowing the coupling between the main housing H and the first plate P1 to be firmly maintained. In this case, as a step is formed in a thickness direction (the third direction Z3) of the first plate P1 at both ends of the region having the filling width W3, a filling space having a concave shape, in which the filling material 30 is filled, may be formed. In detail, at one end of the region having the filling width W3, a filling space may be formed by a step between the main outer rim portion MO, which forms the region having the upper width W1, and the first rim portion P1a, and at the other end of the region having the filling width W3, a filling space may be formed by a step between the first rim portion P1a and the first exposed portion P1b.

According to some embodiments, the first rim portion P1a and the first exposed portion P1b, which form the first plate P1, may be connected to each other in a stepped form in the thickness direction (the third direction Z3) of the first plate P1. For example, the first exposed portion P1b may include an upper surface stepped upward from the first rim portion P1a and be thicker than the first rim portion P1a. As described above, a step between the first exposed portion P1b and the first rim portion P1a, which form the first plate P1, may form a filling space in which the filling material 30 is filled.

The first plate P1 may form the bottom of the accommodation space G, which faces the lower surface of the cell assembly B, together with the main rim M while closing an opening surrounded by the main rim M, and the first exposed portion P1b of the first plate P1 exposed to the accommodation space G may form the cooling passage F for cooling the lower surface of the cell assembly B. That is, the first exposed portion P1b may include an upper surface exposed to the accommodation space G in which the cell assembly B is accommodated, and a lower surface exposed to the cooling passage F, and may mediate heat transfer between the cell assembly B and the cooling passage F. The first plate P1 may include a first rim portion P1a forming a coupling with the main rim portion M, and a first exposed portion P1b exposed from the main rim portion M, and the second plate P2 may include a second rim portion P2a forming a coupling with the main rim portion M, and a second exposed portion P2b exposed from the main rim portion M. In this case, the cooling passage F may be formed between the first exposed portion P1b and the second exposed portion P2b. That is, the cooling passage F may be formed between the lower surface of the first exposed portion P1b and the upper surface of the second exposed portion P2b, and a heat dissipation fin 11 for increasing a contact area with a cooling fluid flowing through the cooling passage F may be formed on the lower surface of the first exposed portion P1b. For example, the heat dissipation fin 11 of the first exposed portion P1b may be formed to protrude toward the second exposed portion P2b that faces the first exposed portion P1b and forms the cooling passage F. As described below, the cooling passage F may be formed in the first direction Z1 corresponding to the longitudinal direction of the accommodation space G, and a refrigerant pipe PL for supplying a cooling medium to the cooling passage F or retrieving the cooling medium from the cooling passage F may be arranged on the front and rear surfaces of the module housing 5 in the first direction Z1. In this case, the heat dissipation fin 11 formed on the first plate P1 (the first exposed portion P1b) may be formed in the first direction Z1 along the cooling passage F.

The second coupling line L2 may include a coupling between the main outer rim portion MO and the second rim portion P2a of the second plate P2. In this case, the sealing portion 50 may be between the main outer rim portion MO and the second rim portion P2a to mediate a coupling between them. For example, the second rim portion P2a may include a flat plate portion 20 coupled to the main outer rim portion MO via the sealing portion 50, and a protruding jaw 21 formed between the flat plate portion 20 and the second exposed portion P2b. In this case, the second rim portion P2a may be aligned in position with the main outer rim portion MO through the protruding jaw portion 21, and may form a coupling with the main outer rim portion MO through the flat plate portion 20.

With respect to the position alignment between the second rim portion P2a and the main outer rim portion MO, the second rim portion P2a and the main outer rim portion MO may be aligned in position with each other while a pair of protrusions 25 formed on the main outer rim portion MO with the protruding jaw 21 of the second rim portion P2a therebetween are fitted onto the protruding jaw 21. For example, in a region having the lower width W2, which covers the lower surface of the first rim portion P1a in the main outer rim portion MO, a pair of protrusions 25 protruding toward both sides of the protruding jaw 21 may be formed. As the pair of protrusions 25 are fitted onto the protruding jaw 21 to sandwich the protruding jaw 21 therebetween, position alignment between the main outer rim portion MO in which the pair of protrusions 25 is formed and the second rim portion P2a in which the protruding jaw 21 is formed may be made.

The protruding jaw 21 may include an upper surface protruding upward and a concave lower surface (corresponding to a jig groove 22) drawn in from below, and may be aligned in position with the main outer rim portion MO through the protruding upper surface and firmly fix a coupling position of the second plate P2 through the concave lower surface (corresponding to the jig groove 22). In this case, the protruding upper surface of the protruding jaw 21 may be interposed between the sealing portion 50 and the cooling passage F while contributing to position alignment with the main outer rim portion MO, and thus may prevent or reduce a sealing material forming the sealing portion 50 from leaking into the cooling passage F and blocking the cooling passage F. The protruding jaw 21 may be formed between the flat plate portion 20 on which the sealing portion 50 is formed and the first exposed portion P1b forming the cooling passage F, and may prevent or reduce blocking of the cooling passage F due to leakage of the sealing portion 50.

The protruding jaw 21 may be formed to have a embossing shape including a protruding upper surface and a concave lower surface, and the pressing portion PG of the molding jig may be fitted into the jig groove 22 formed by the concave lower surface. In the manufacture of the module housing 5 according to some embodiments, a primary molding body in which the main housing H and the first plate P1, which include different materials, are integrated may be formed through primary molding corresponding to insert molding, and then secondary molding for injecting a sealing material between the primary molding body and the second plate P2 may be subsequently performed. In this case, the second plate P2 formed in the primary molding may be slid to a position in contact with the primary molding body, and then, in a state where the second plate P2 is position-fixed to be in contact with the primary molding body, a sealing material for coupling the primary molding body to the second plate P2 may be injected. In this case, in order to firmly position-fix the coupling position of the second plate P2 to an original position, secondary molding may be performed in a state where the pressing portion PG of the molding jig is fitted through the jig groove 22 of the second plate P2. In the primary molding according to some embodiments, a primary molding body, in which the main housing H and the first plate P1 are integrated, may be formed together with the second plate P2, and a sealing material may be injected in a state where a molding jig of the primary molding body and a molding jig of the second plate P2, which are apart from each other, approach each other and thus the primary molding body and the second plate P2 are position-fixed to be in contact with each other. In this case, the coupling position of the second plate P2 may be firmly fixed through the pressing portion PG of a molding jig fitted in the jig groove 22 of the second plate P2. When the position of the second plate P2 is disturbed in the secondary molding for forming the sealing portion 50, leakage of the cooling passage F formed by the second plate P2 may occur, and thus, the coupling position may be firmly maintained through the jig groove 22 of the second plate P2 and the leakage of the cooling passage F may be blocked.

With respect to the coupling between the second rim portion P2a and the main outer rim portion MO, the sealing portion 50 may be arranged between the second rim portion P2a and the main outer rim portion MO and couple the second rim portion P2a to the main outer rim portion MO. The sealing portion 50 may couple the flat plate portion 20 of the second rim portion P2a to the main outer rim portion MO while filling a space between the flat plate portion 20 of the second rim portion P2a and the main outer rim portion MO. The sealing portion 50 may include a first sealing portion 51 between the flat plate portion 20 of the second rim portion P2a and the main outer rim portion MO, and a second sealing portion 52 extending across the first sealing portion 51 from a position in contact with the outside of the main outer rim portion MO in a direction intersecting with the first sealing portion 51.

The first sealing portion 51 may extend substantially in a plane direction (the second direction Z2) of the flat plate portion 20 or the second plate P2 including the flat plate portion 20 and be formed between the flat plate portion 20 and the main outer rim portions MO. The second sealing portion 52 may extend to a position out of the first sealing portion 51 across the first sealing portion 52 from a position in contact with the outside of the main outer rim portion MO in a direction intersecting with the first sealing portion 51, that is, substantially in a thickness direction (the third direction Z3) of the second plate P2 including the flat plate portion 20. In this case, the first and second sealing portions 51 and 52 may extend in the second and third directions Z2 and Z3 crossing each other, the first sealing portion 51 may be formed between the flat plate portion 20 and the main outer rim portion MO, and the second sealing portion 52 may extend across the first sealing portion 51 from a position in contact with the outside of the main outer rim portion MO. In this limit, it is sufficient when the first and second sealing portions 51 and 52 extend in directions crossing each other, and it is not necessary for the first sealing portion 51 and the second sealing portion 52 to respectively extend in a plane direction (the second direction Z2) of the flat plate portion 20 or the second plate P2 including the flat plate portion 20 and a thickness direction (the third direction Z3) of the flat plate portion 20 or the second plate P2 including the flat plate portion 20. That is, according to some embodiments, the first and second sealing portions 51 and 52 may extend substantially in the plane direction (the second direction Z2) of the second plate P2 and substantially in the thickness direction (the third direction Z3) of the second plate P2, respectively. However, the extending directions of the first and second sealing portions 51 and 52 are not limited thereto, and it is sufficient that the first and second sealing portions 51 and 52 extend in directions crossing each other.

As described below, the sealing portion 50 may be formed by a sealing material injected between the main rim portion M and the second rim portion P2a aligned with each other, and the main outer rim portion MO), and the sealing material may be injected from a position in contact with the outside of the main outer rim portion MO. The fact that the second sealing portion 52 is formed from a position in contact with the outside of the main outer rim portion MO may denote that the main outer rim portion MO includes an injection space of the sealing material in the form in which the main outer rim portion MO is open to the outside in order to inject the sealing material. For example, the injection space of the sealing material may be formed in a shape matched with the first and second sealing portions 51 and 52 from a position in contact with the outside of the main outer rim portion MO.

The second sealing portion 52 may extend substantially in an injection direction of the sealing material, that is, the second sealing portion 52 may extend substantially in the third direction Z3 from a position in contact with the outside, and thus, the sealing material may be smoothly injected. The first sealing portion 51 may intersect with the second sealing portion 52 at an intermediate position (e.g., a position corresponding to the upper surface of the flat plate portion 20) of the second sealing portion 52 in the third direction Z3, and thus may block the formation of a void in which the sealing material is not filled according to a flow for changing the direction of the sealing material at the intersection of the first and second sealing portions 51 and 52. For example, unlike in the present disclosure, when the intersection of the first and second sealing portions 51 and 52 is at the uppermost position of the second sealing portion 52 in the third direction Z3, a void in which the sealing material is not filled according to a flow for changing the direction of the sealing material at the intersection of the second sealing portions 51 and 52.

Because the second sealing portion 52 is formed up to a position in contact with the outside, the sealing material forming the second sealing portion 52 may have sealing characteristics capable of blocking external harmful materials. The first and second sealing portions 51 and 52 may be formed of the same material through injection of the same sealing material, and the sealing material may include a material having excellent sealing characteristics capable of blocking external harmful materials.

The second plate P2 may be aligned in position with respect to the main housing H through the pair of protrusions 25 fitted onto the protruding jaw 21 with the protruding jaw 21 therebetween, and the position alignment of the second plate P2 may limit the size of the cooling passage F defined by the second plate P2. For example, the cooling passage F may be formed between the first plate P1 and the second plate P2, that is, between the first exposed portion P1b of the first plate P1 and the second exposed portion P2b of the second plate P2. In this case, the height of the cooling passage F formed between the first exposed portion P1b and the second exposed portion P2b may be determined according to the fit between the protruding jaw 21 and the protrusions 25. For example, according to the height of the second plate P2 determined according to the fit between the protruding jaw 21 and the protrusions 25, the size of the cooling passage F formed between the first plate P1 and the second plate P2 may be determined.

The first and second rim portions P1a and P2a may form a coupling with the main outer rim portion MO, and may be coupled to the main outer rim portion MO through the recessed holding portion RH of the main outer rim portion MO and the sealing portion 50, respectively. The first and second rim portions P1a and P2a may be formed at least partially overlapping each other so as to overlap the region having the lower width W2 of the main outer rim portion MO therebetween.

Referring to FIG. 8, the first coupling line L1 may include a coupling between the main inner rim portion MI and the first rim portion P1a of the first plate P1. The first coupling line L1 may form a coupling with two first plates P1 formed on both sides of the main inner rim portion MI, and thus, the first coupling line L1 forming a coupling with the main inner rim portion MI may include a pair of recessed holding portions RH forming a coupling with the two first plates P1 arranged on both sides of the main inner rim portion MI. Each of the recessed holding portions RH may form a coupling with each of the first plates P1, and may have a concave shape to consecutively cover the upper surface, the lower surface, and the side surface of the first rim portion P1a of the first plate P1. Each recessed holding portion RH may include a region having an upper width W1, which covers the upper surface of the first rim portion P1a, and a region having a lower width W2, which covers the lower surface of the first rim portion P1a. In addition, the lower width W2 of the recessed holding portion RH may be greater than the upper width W1 of the recessed holding portion RH in the second direction Z2, and a region having a filling width W3, in which the filling material 30 is formed, may be formed on the first rim portion P1a that is out of the region having the upper width W1 that is relatively narrow, Referring to FIG. 8, the second coupling line L2 may include a coupling between the main inner rim portion MI and the second rim portion P2a of the second plate P2. The sealing portion 50 may be between the main inner rim portion MI and the second rim portion P2a to mediate the coupling therebetween. The sealing portion 50 may form a coupling with the second rim portion P2a formed along the periphery of the elongated slot S of the second plate P2, and may be formed to have a symmetrical form for coupling with the second rim portion P2a formed on both sides of the elongated slot S. According to some embodiments, the sealing portion 50 may include a third sealing portion 53 extending between the second rim portion P2a and the main inner rim portion MI, and a fourth sealing portion 54 extending from the elongated slot S of the second plate P2 in a direction intersecting with the third sealing portion 53. For example, the third sealing portion 53 may extend in a plane direction (the second direction Z2) of the second plate P2, and the fourth sealing portion 54 may extend in the direction intersecting with the third sealing portion 53, for example, in a thickness direction (the third direction Z3) of the second plate P2. The fourth sealing portion 54 may extend from the elongated slot S of the second plate P2 toward the main inner rim portion MI in an injection direction (the third direction Z3) of a sealing material, and thus, the sealing material may be smoothly injected. The third sealing portion 53 may intersect with the fourth sealing portion 54 at an intermediate position (e.g., a position corresponding to the upper surface of the second rim portion P2a) in the extension direction (the third direction Z3) of the fourth sealing portion 54 corresponding position), that is, at an intermediate position between the uppermost position and the lowermost position of the fourth sealing portion 54 in the third direction Z3, and thus, may block the formation of a void in which the sealing material is not filled according to a flow according to a direction change of the sealing material at the intersection of the third and fourth sealing portions 53 and 54. Unlike in the present disclosure, when the third and fourth sealing portions 53 and 54 intersect with each other at the uppermost position in the extension direction (the third direction Z3) of the fourth sealing portion 54, a void in which the sealing material is not filled according to a flow according to the direction change of the sealing material may be formed. With respect to the injection position of the sealing material, the sealing material may be injected from the elongated slot S of the second plate P2, and an injection space of the sealing material, which extends from a position corresponding to the elongated slot S, may be formed in the main inner rim portion MI in contact with the elongated slot S of the second plate P2. In this case, the injection space of the sealing material may be formed from a position in contact with the outside (or the elongated slot S of the second plate P2) of the main inner rim portion MI. For example, the injection space of the sealing material may be formed to have a shape to match the third and fourth sealing portions 53 and 54 from a position in contact with the elongated slot S of the second plate P2.

The third sealing portion 53 may extend from both sides of the fourth sealing portion 54 in the second direction Z2. The third sealing portion 53 forms a coupling of the second rim portion P2a formed along the periphery of the elongated slot S, and may be formed on both sides of the elongated slot S to make a coupling with the second rim portion P2a formed on both sides of the elongated slot S. In this way, the third sealing portion 53 may intersect with the fourth sealing portion 54 at an intermediate position (e.g., a position corresponding to the upper surface of the second rim portion P2a) in the extension direction (the third direction Z3) of the fourth sealing portion 54 and extend to both sides of the fourth sealing portion 54, and the third and fourth sealing portions 53 and 54 may be formed in a cross shape as a whole.

Referring to FIG. 5, the second coupling line L2 for coupling the second rim portion P2a to the main inner rim portion MI may be formed along the elongated slot S, and may be not disconnected from a bridge BR between elongated slots S adjacent to each other in the first direction Z1 and be continuously formed along the elongated slots S and the bridge BR arranged in the first direction Z1. In this case, a elongated slot S for injecting the sealing material is not formed in the bridge BR, but the sealing material may be injected through the elongated slot S adjacent to each other in the first direction Z1, and the second coupling line L2 may be continuously formed along the elongated slots S and the bridge BR in the first direction Z1.

The sealing portion 50 (corresponding to an outer sealing portion 50a) described with reference to FIG. 7 forms a coupling with the second rim portion P2a formed along the edge of the second plate P2, and may be formed to have an asymmetrical shape for coupling with one second rim portion P2a formed at the edge of the second plate P2. For example, the first sealing portion 51 may extend from one side of the second sealing portion 52. On the contrary, the sealing portion 50 (corresponding to an inner sealing portion 50b) described with reference to FIG. 8 forms a coupling with the second rim portion P2a formed along the periphery of the elongated slot S of the second plate P2, and may be formed to have a symmetrical shape for coupling with two second rim portions P2a formed on both sides of the elongated slot S. For example, the third sealing portion 53 may extend from both sides of the fourth sealing portion 54.

For reference, the sealing portion 50 (corresponding to the outer sealing portion 50a) formed along the edge of the second plate P2 may include a first sealing portion 51 extending between the main rim portion M and the second rim portion P2a, and a second sealing portion 52 extending across the first sealing portion 51 in a direction intersecting with the first sealing portion 51 from a position in contact with the outside of the main rim portion M. In addition, the sealing portion 50 (corresponding to the inner sealing portion 50b) formed along the periphery of the elongated slot S of the second plate P2 may include a third sealing extending between the main rim portion M and the second rim portion P2a, and a fourth sealing portion 54 extending across the third sealing portion 53 in a direction intersecting with the third sealing portion 53 from a position in contact with the elongated slot S of the second plate P2 corresponding to the outside of the main rim portion M. In this case, in that the first and third sealing portions 51 and 53 extend between the main rim portion M and the second rim portion P2a, the first and third sealing portions 51 and 53 may correspond to the first sealing portion of the claims. In addition, in that the second and fourth sealing portions 52 and 54 extend across the first and third sealing portions 51 and 53 (corresponding to the first sealing portion of the claims) in a direction intersecting with the first and third sealing portions 51 and 53 from a position in contact with the outside of the main rim portion M, the second and fourth sealing portions 52 and 54 may correspond to the second sealing portion of the claims. However, as described above, according to the position of the sealing portion 50, the sealing portion 50 (corresponding to the outer sealing portion 50a (refer to FIG. 7)) formed along the edge of the second plate P2 may include the first sealing portion 51 extending from one side of the second sealing portion 52 and thus may form an asymmetrical cross-section, and the sealing portion 50 (corresponding to the inner sealing portion 50b (refer to FIG. 8)) formed along the periphery of the elongated slot S of the second plate P2 may include the third sealing portion 53 (corresponding to the first sealing portion of the claims) extending from both sides of the fourth sealing portion 54 (corresponding to the second sealing portion of the claims) and thus may form a symmetrical cross-section.

Referring to FIGS. 7 and 8, a protruding jaw 21 may be formed on the second rim portion P2a of the second plate P2. The protruding jaw 21 may be formed in each of a second rim portion P2a (i.e., a second rim portion P2a adjacent to the main outer rim portion MO) formed at the edge of the second plate P2 and a second rim portion P2a (i.e., a second rim portion P2a adjacent to the main inner rim portion MI) formed around the elongated slot S of the second plate P2. The protruding jaw 21 may include an upper surface protruding upward and a concave lower surface drawn in from below, and the concave lower surface of the protruding jaw 21 may function as a jig groove 22. The protruding upper surface of the protruding jaw 21 may function as a wall for defining the cooling passage F therebetween, and the cooling passage F may be formed between a protruding jaw 21 formed at the edge of the second plate P2 and a protruding jaw 21 formed around the elongated slot S of the second plate P2. The protruding jaw 21 may function to protect the cooling passage F, for example, may block the cooling passage F from being clogged as the sealing portion 50 (i.e., a sealing material forming the sealing portion 50) formed around the cooling passage F leaks into the cooling passage F.

The cooling passage F may be formed between the first plate P1 formed for each individual accommodation space G and the second plate P2 arranged to face the first plate P1, and may be formed between the first exposed portion P1b of the first plate P1 and the second exposed portion P2b of the second plate P2. In this case, the first exposed portion P1b may define one side of the cooling passage F in the third direction Z3, and the second exposed portion P2b may define the other side of the cooling passage F in the third direction Z3. In this case, the second exposed portion P2b defining the other side of the cooling passage F may correspond to a region between a protruding jaw 21 (refer to FIG. 7) formed at the edge of the second plate P2 and a protruding jaw 21 (refer to FIG. 8) formed around the elongated slot S of the second plate P2. The cooling passage F may be formed individually for each accommodation space G, and the first plate P1 may be formed individually for each accommodation space G and may define one side of the cooling passage F. On the other hand, the second plate P2 is not formed individually for each accommodation space G, but may define one cooling passage F from one edge of the second plate P2 to the elongated slot S (i.e., to the protruding jaw 21 around the elongated slot S) and may define another cooling passage F from the elongated slot S (i.e., from the protruding jaw 21 around the elongated slot S) to another edge of the second plate P2. In this case, a pair of protruding jaws 21 (protruding jaws 21 adjacent to the main inner rim MI) formed around the elongated slot S may form different cooling passages F, respectively. The pair of protruding jaws 21 formed around the elongated slot S may include upper surfaces connected flat to each other, and the elongated slot S formed between the pair of protruding jaws 21 may provide an injection position of the sealing material for the formation of the third and fourth sealing portions 53 and 54. According to some embodiments, the protruding jaw 21 formed around the elongated slot S may be formed between the cooling passage F and the sealing portion 50, and may prevent or reduce instances of a sealing material for forming the sealing portion 50 leaking into the cooling passage F and blocking the cooling passage F. For example, resistance to a leakage path of the sealing material may be increased through the upper surface of the protruding jaw 21, and thus, instances of the sealing material leaking into the cooling passage F may be prevented or reduced.

According to some embodiments, the cooling passage F may extend in the first direction Z1 corresponding to a longitudinal direction of the battery module 1, and the cooling passage F extending in the first direction Z1 may extend across the accommodation space G arranged in the first direction Z1 and may cool the cell assembly B accommodated in the accommodation space G.

The module housing 5 according to some embodiments may be formed by DSI. For example, in the DSI, the main housing H and the first plate P1, which include different materials through primary molding, may be integrally formed by insert molding. In this case, in the primary molding, insert molding of the main housing H and the first plate P1 and molding of the second plate P2 may be performed together. For example, in the primary molding, a molding jig for insert molding and a molding jig for the formation of the second plate P2 may undergo respective molding processes at positions apart from each other. In the secondary molding subsequent to the primary molding, after the primary molding body, in which the main housing H and the first plate P1 are integrated, and the second plate P2 are slid to a position in contact with each other while at least one molding jig between the molding jig for the insert molding and the molding jig for the formation of the second plate P2 slide toward each other, a sealing material may be injected through the injection position, and thus, a sealing portion 50 that mediates coupling between the primary molding body and the second plate P2 may be formed.

According to some embodiments, in order to increase a coupling force in the secondary molding, the main housing H, the second plate P2, and the sealing portion 50 may include the same resin material, and the first plate P1 may include a metal material having excellent heat conduction characteristics, for example, an aluminum material, in consideration of the cooling performance of the accommodation space G. As described above, the module housing 5 according to some embodiments may including a composite material including a metal material and a resin material.

Hereinafter, a structure of the first coupling line L1 that forms a coupling between the first plate P1 and the main housing H is described with reference to FIG. 4. The first coupling line L1 may be formed along the first rim portion P1a formed at the edge of the first plate P1 formed individually for each accommodation space G, and thus, the first coupling line L1 may form each closed loop surrounding each accommodation space G. In other words, the first coupling line L1 may be formed to have a closed loop shape along the edge of the first plate P1 individually formed for each accommodation space G. For example, the first coupling line L1 may be formed to have the form of four closed loops that individually surround the first to fourth accommodation spaces G1, G2, G3, and G4, respectively. For example, according to some embodiments, the first coupling line L1 having a closed loop shape may have an angled corner. As described below, the second coupling line L2 may be formed to have a closed loop shape along the edge of the second plate P2, and the second coupling line L2 may have a round corner in consideration of the fluidity of the sealing material for the formation of the sealing portion 50. Because the second coupling line L2 includes the sealing portion 50 formed through injection of the sealing material, the second coupling line L2 may have a round corner in consideration of the fluidity of the sealing material, and because the first coupling line L1 includes the recessed holding portion RH formed by insert molding, the first coupling line L1 may have an angled corner, unlike the second coupling line L2.

The first coupling line L1 may surround each accommodation space G, and may be formed in pairs along the elongated slot S of the second plate P2 formed between adjacent accommodation spaces G, that is, between the first and second accommodation spaces G1 and G2 adjacent to each other in the second direction Z2 and the third and fourth accommodation spaces G3 and G4 adjacent to each other in the second direction Z2. For example, along the elongated slot S of the second plate P2, the first coupling line L1 may include a pair of first coupling lines L1 that individually surround the first and second accommodation spaces G1 and G2, and a pair of first coupling lines L1 that individually surround the third and fourth accommodation spaces G3 and G4.

Hereinafter, a structure of the second coupling line L2 that forms a coupling between the second plate P2 and the main housing H is described with reference to FIG. 5. The second coupling line L2 may include a second coupling line L2 formed to have a closed loop shape along the second rim portion P2a formed at the edge of the second plate P2 formed in common with respect to all of the accommodation spaces G. In this case, because the second coupling line L2 includes the sealing portion 50 formed by injection of the sealing material, the second coupling line L2 having a closed loop shape may have a round corner in consideration of the fluidity of the sealing material. For example, because the second coupling line L2 having a closed loop shape may be formed while the sealing material flows along the second coupling line L2 by setting at least one location along the second coupling line L2 as an injection position of the sealing material, the second coupling line L2 may have a round corner in consideration of the fluidity of the sealing material.

The second coupling line L2 may be formed to have a stripe shape along the second rim portion P2a formed around the elongated slot S formed inside the second plate P2. In this case, the second coupling line L2 may be not disconnected from the bridge BR between elongated slots S by setting the position of each of the elongated slots S as the injection position of the sealing material, and may extend continuously in the first direction Z1 across the bridge BR. The second coupling line L2 may be formed by injecting the sealing material at at least one location, which is set as the injection position of the sealing material, along the stripe-shaped second coupling line L2. In this case, a second coupling line L2 extending in a stripe shape while the sealing material flows in the second direction Z2 may be formed.

Figure 9:
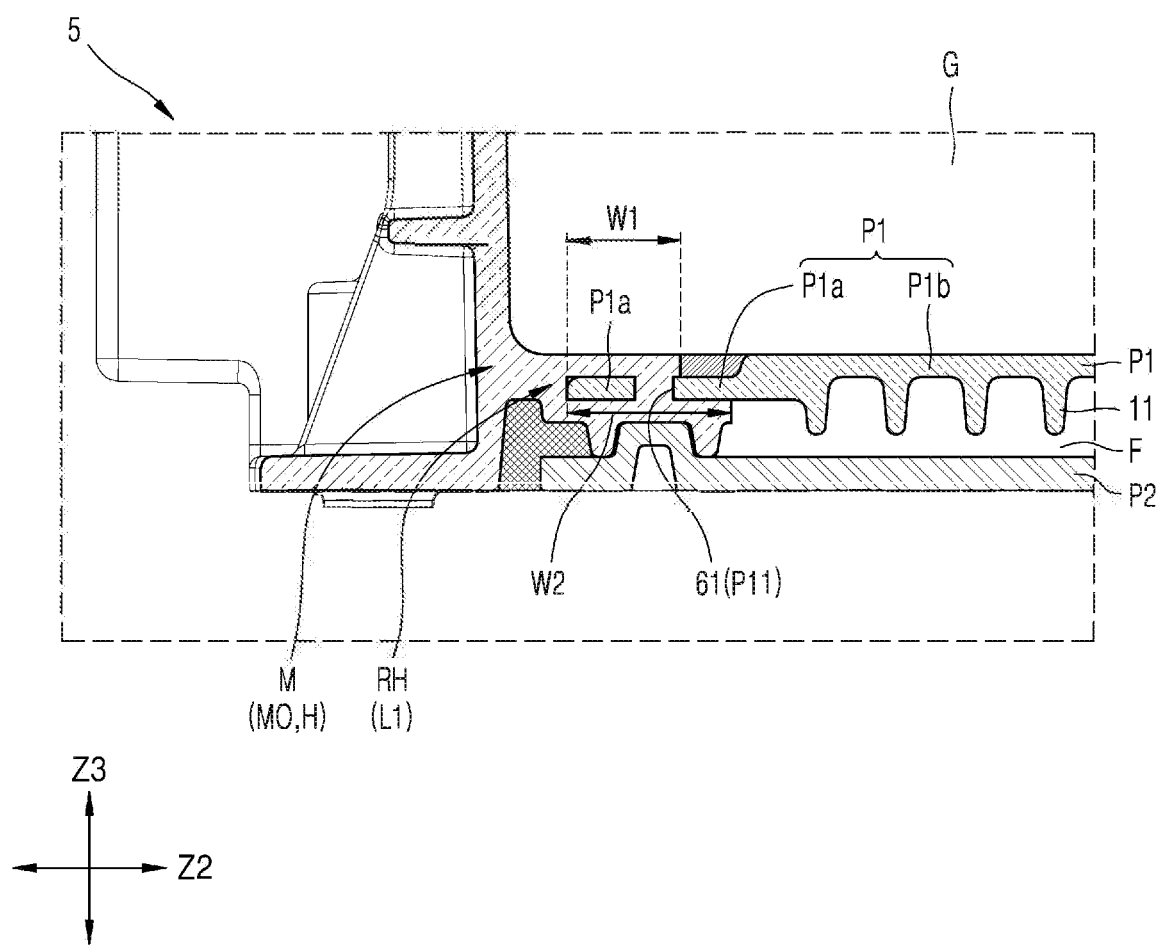
FIG. 9 is a cross-sectional view illustrating a matching structure of a module housing according to some embodiments.
Figure 10:
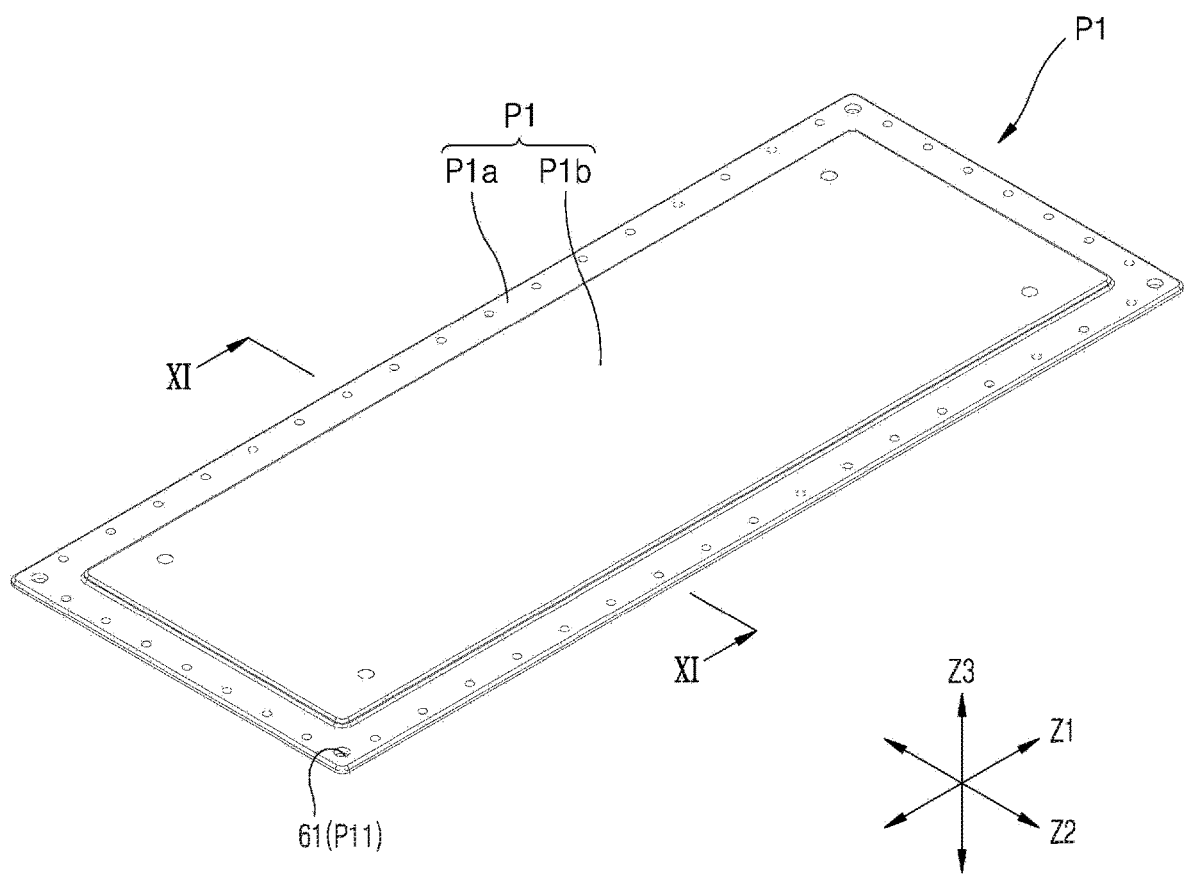
FIG. 10 is a perspective view illustrating a first plate shown in FIG. 9.
Figure 11:
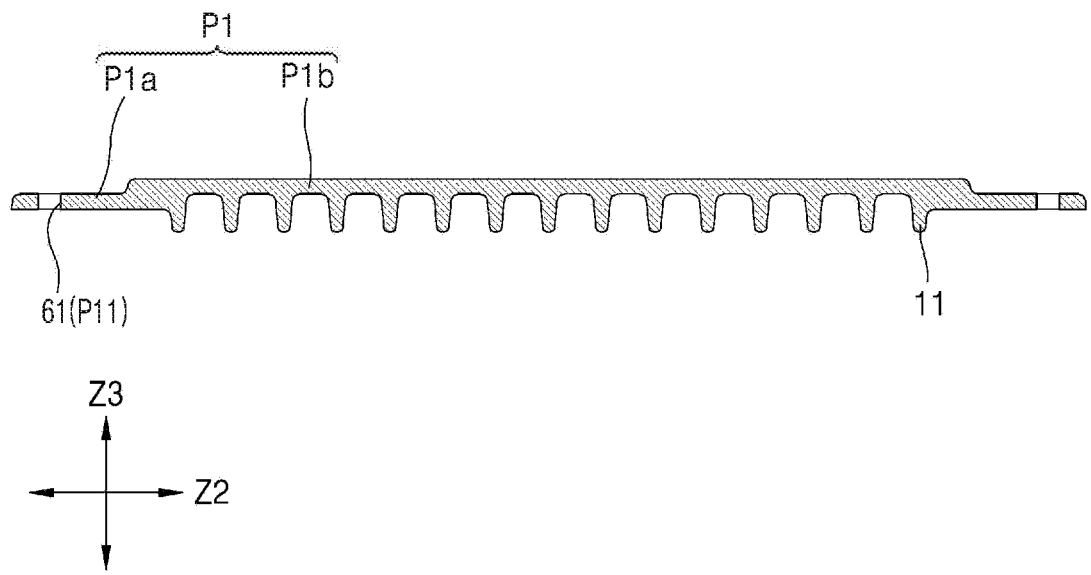
FIG. 11 is a cross-sectional view of the first plate taken along the line XI-XI of FIG. 10.
Figure 12:
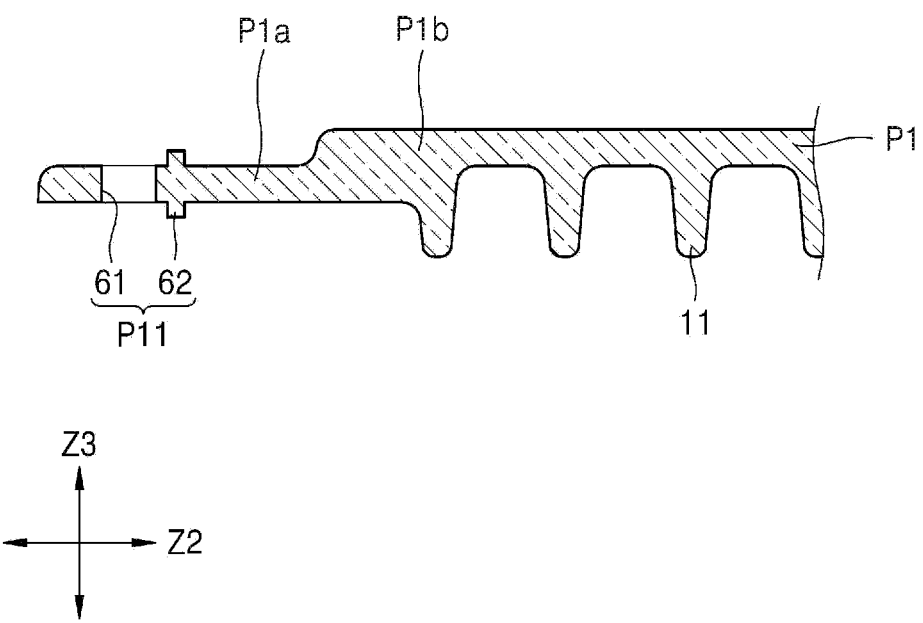
FIG. 12 is a cross-sectional view of the first plate shown in FIG. 9 according to some embodiments.
Figure 13:
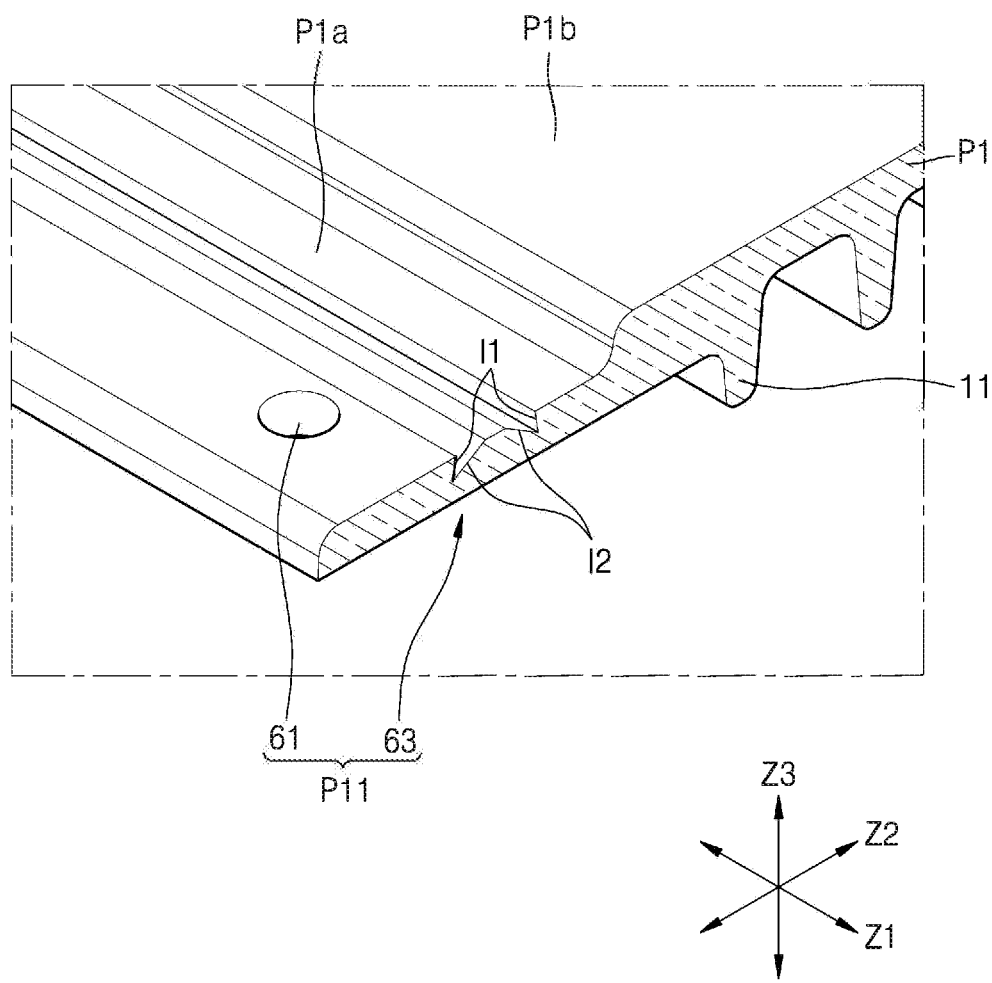
FIG. 13 is a perspective view of the first plate shown in FIG. 9 according to some embodiments.

FIG. 9 is a cross-sectional view illustrating a matching structure of a module housing according to some embodiments. FIG. 10 is a perspective view illustrating a first plate shown in FIG. 9. FIG. 11 is a cross-sectional view of the first plate taken along the line XI-XI of FIG. 10. FIG. 12 is a cross-sectional view of the first plate shown in FIG. 9 according to some embodiments. FIG. 13 is a perspective view of the first plate shown in FIG. 9 according to some embodiments.

Referring to FIGS. 9 to 13, the module housing 5 according to some embodiments may include a matching structure P11 between a first rim portion P1a and a main rim portion M, as a structure for reinforcing a coupling force between a first plate P1 and a main housing H, which are formed through insert molding. In this case, the matching structure P11 between the first rim portion P1a and the main rim portion M may denote a structure in which the first rim portion P1a and the main rim portion M, which are integrated through insert molding, are fitted into each other through a complementary shape so as not to be separated from each other. For example, according to some embodiments, a hole 61, a protrusion 62, and an unevenness pattern 63 may be formed along the first rim portion P1a formed at the edge of the first plate P1, and the hole 61, the protrusion 62, and the unevenness pattern 63 formed along the first rim portion P1a may be filled or covered by a part of the main housing H having a shape complementary to them, and may form an interface with the main housing H. In this case, the hole 61, the protrusion 62, and the unevenness pattern 63 formed in the first rim portion P1a may form a strong coupling between the first rim portion P1a and the main housing H while being filled or covered by a part of the main housing H having a shape complementary to them, or forming an interface. In this case, the part of the main housing H that forms a physical interference with the hole 61, the protrusion 62, and the unevenness pattern 63 formed in the first rim portion P1a may denote at least one of the region having the upper width W1, which covers the upper surface of the first rim portion P1a, or the region having the lower width W2, which covers the lower surface of the first rim portion P1a, in the recessed holding portions RH forming a coupling with the first rim portion P1a. In the recessed holding portion RH, at least one of the region having the upper width W1 or the region having the lower width W2 may form a strong coupling to the first plate P1 while filling or covering the hole 61, the protrusion 62, and the unevenness pattern 63 formed in the first rim portion P1a, or forming an interface.

For example, as shown in FIG. 12, the protrusion 62 protruding in both up and down directions from the first rim portion P1a may form a matching structure P11 with the region having the upper width W1 and the region having the lower width W2 in the recessed holding portion RH. For example, in each of the region having the upper width W1 and the region having the lower width W2, a groove shape complementary to the protrusion 62 may be formed to embed the protrusion 62. In addition, as shown in FIG. 13, the unevenness pattern 63 formed upward from the first rim portion P1a may form the matching structure P11 with the region having the upper width W1 in the recessed holding portion RH. For example, a wedge shape complementary to the unevenness pattern 63 may be formed in the region having the upper width W1 to form an inclined interface with the unevenness pattern 63. As shown in FIG. 9, the hole 61 formed in the first rim portion P1a may be filled by a protrusion shape extending from the region having the upper width W1 and the region having the lower width W2 in the recessed holding portion RH. The protrusion shape extending from the region having the upper width W1 and the region having the lower width W2 in the recessed holding portion RH may form the matching structure P11 while filling the hole 61 of the first edge portion P1a.

Hereinafter, the matching structure P11 between the first plate P1 and the main housing H is described in more detail.

Referring to FIGS. 9 to 11, the hole 61 filled with a part of the main rim portion M may be formed in the first rim portion P1a formed along the edge of the first plate P1. According to some embodiments, the hole 61 formed in the first rim portion P1a may be formed along the edge of the first plate P1, and may be formed entirely along the first coupling line L1 that forms a coupling with the first rim portion P1a formed in the edge of the first plate P1. The hole 61 of the first rim portion P1a may be filled with a part of the main rim portion M having a complementary shape to thereby improve a coupling strength between the first rim portion P1a and the main rim portion M. For example, the first plate P1 may be formed together with the main housing H through insert molding. In this case, the hole 61 formed in the first rim portion P1a of the first plate P1 in the insert molding may be filled with a molten resin forming the main housing H, and thus, the main rim portion M filling the hole 61 of the first rim portion P1a may be formed. In this case, the main rim portion M may be formed to have a complementary shape to fill the hole 61 of the first rim portion P1a, and the main rim portion M and the hole 61 of the first rim portion P1a may form a strong coupling while forming a shape coupling with respect to each other.

The first plate P1 forms a cooling passage F together with the second plate P2. When the first plate P1 is lifted by the high pressure of a cooling medium flowing through the cooling passage F, the leakage of the cooling medium occurs, and thus, it is necessary to firmly fix the position of the first plate P1 and increase the coupling force between the first plate P1 and the main housing H. Accordingly, according to some embodiments, by forming a plurality of holes 61 along the edge of the first plate P1 so as to be shape-coupled through insert molding, a coupling strength between the first plate P1 and the main housing H may be increased, and the leakage of the cooling passage F formed by the first plate P1 may be blocked. In the first exposed portion P1b of the first plate P1 defining one side of the cooling passage F, a plurality of heat dissipation fins 11 protruding toward the cooling passage F may be formed. According to some embodiments, the plurality of heat dissipation fins 11 may extend in the first direction Z1 in which the cooling passage F extends. In this case, the first direction Z1 in which the cooling passage F extends may correspond to the longitudinal direction of the accommodation space G.

Referring to FIG. 12, the protrusion 62 may be formed around the hole 61 formed at the edge of the first plate P1. The protrusion 62 may be formed along the first rim portion P1a formed at the edge of the first plate P1, and according to some embodiments, the protrusion 62 may be formed entirely along the first coupling line L1 formed along the edge of the first plate P1. Similar to the hole formed along the edge of the first plate P1, the protrusion 62 may reinforce a coupling force formed through insert molding between the first rim portion P1a and the main rim portion M. For example, the protrusion 62 formed to protrude from the edge of the first plate P1 in a thickness direction (the third direction Z3) thereof may form a shape coupling with the main rim part M for embedding the protrusion 62 in a complementary shape. A groove in a complementary shape may be formed in the main rim portion M to accommodate the protrusion 62 of the first rim portion P1a, and the protrusion 62 and the main rim portion M may form a shape coupling with each other. According to some embodiments, the fact that the main rim portion M embeds the protrusion 62 in a complementary shape may denote that the main rim portion M is formed in a shape complementary to the protrusion 62 and surrounds the protrusion 62 as a whole so that the protrusion 62 is not exposed.

According to some embodiments, the protrusion 62 may protrude in both up and down directions in the thickness direction (the third direction Z3) of the first plate P1, and in the main rim portion M, grooves for accommodating the protrusion 62 may be formed at both upper and lower sides of the first plate P1. According to some embodiments, the protrusion 62 may be formed around the hole 61 formed along the edge of the first plate P1. For example, the protrusion 62 may be formed at an inner position from the hole 61 formed at the edge of the first plate P1. However, according to some embodiments, the protrusion 62 may be formed along the edge of the first plate P1 in which the hole 61 is not formed, and regardless of whether the hole 61 is present or not, the protrusion 62 may form a shape coupling between the first rim portion P1a and the main rim portion M and may improve a coupling strength therebetween.

Referring to FIG. 13, the unevenness pattern 63 forming an inclined interface with the main rim portion M may be formed on the edge of the first plate P1. For example, the unevenness pattern 63 may be formed along the edge of the first plate P1, for example, may be formed entirely along the first coupling line L1 formed at the edge of the first plate P1. According to some embodiments, the unevenness pattern 63 may form an interface with the main rim portion M formed in a complementary shape, and may form at least one inclined interface. For example, the unevenness pattern 63 may form an inclined interface in the second direction Z2. For example, the unevenness pattern 63 may form a first pair I1 of interfaces inclined to face each other, and according to some embodiments, the unevenness pattern 63 may form a dovetail-shaped inclined interface with the main rim portion M. For example, the unevenness pattern 63 may form an interface inclined at an inclination of about 45 degrees with respect to the second direction Z2 and an interface inclined at an inclination of about −45 degrees with respect to the second direction Z2, and thus, the first pair I1 of interfaces inclined to face each other may be formed. In this case, the fact that each of the first pair I1 of interfaces formed by the unevenness pattern 63 are inclined to face each other may denote that each of the first pair I1 of interfaces have inclinations to gradually approach each other from a lower position to an upper position in the thickness direction (the third direction Z3) of the first plate P1. In other words, the first pair I1 of interfaces formed by the unevenness pattern 63 may have inclinations to approach each other from a lower position to an upper position in the opposite direction to the second plate P2. In this way, as the first pair I1 of interfaces have inclinations to approach each other from a lower position to an upper position, a portion of the main housing H formed between the first pair I1 of interfaces may be effectively prevented from being separated through a gap between the first pair I1 of interfaces.

The unevenness pattern 63 is configured to reinforce a coupling strength between the first plate P1 and the main housing H, which are integrated through insert molding, and a shape coupling may be formed while the main housing H fills the unevenness pattern 63 of the first plate P1 in a complementary shape. According to some embodiments, the unevenness pattern 63 may be formed together with the hole 61 at the edge of the first plate P1. For example, according to some embodiments, on the edge (the first rim portion P1a) of the first plate P1, the hole 61 and the unevenness pattern 63, filled by the main rim portion M, may be formed together. In this case, the unevenness pattern 63 may be formed at an inner position than the hole 61 formed at the edge of the first plate P1. However, according to some embodiments, the unevenness pattern 63 may be formed along the edge of the first plate P1, in which the hole 61 is not formed, and regardless of whether the hole 61 is present or not, the unevenness pattern may form a shape coupling between the first rim portion P1a and the main rim portion M and thus may improve a coupling strength therebetween.

According to some embodiments, the unevenness pattern 63 may form the first pair I1 of interfaces inclined to face each other, and a second pair I2 of interfaces inclined to face each other between the first pair I1 of interfaces facing each other. In this case, as described above, the fact that the first pair I1 of interfaces are inclined to face each other may denote that the first pair I1 of interfaces have inclinations to gradually approach each other from a lower position to an upper position in the thickness direction (the third direction Z3) of the first plate P1. In addition, the fact that the second pair I2 of interfaces are inclined to face each other may denote that the second pair I2 of interfaces have inclinations to gradually approach each other from a lower position to an upper position in the thickness direction (the third direction Z3) of the first plate P1. In this case, the first pair I1 of interfaces may include an interface inclined at an inclination of about 45 degrees with respect to the second direction Z2 and an interface inclined at an inclination of about −45 degrees with respect to the second direction Z2. In addition, the second pair I2 of interfaces may include an interface more inclined downward toward the second plate P2 than the first pair I1 of interfaces. For example, the second pair I2 of interfaces may include an interface inclined at an inclination greater than about 45 degrees and an interface inclined at an inclination greater than about −45 degrees. According to some embodiments, each of the first pair I1 of interfaces and the second pair I2 of interfaces have inclinations to approach each other from a lower position to an upper position in a direction opposite to the second plate P2, but the second pair I2 of interfaces may have inclinations that are more inclined toward the second plate P2 than the first pair I1 of interfaces.

With respect to the unevenness pattern 63 including the first pair I1 of interfaces and the second pair I2 of interfaces, the main housing H may form a shape coupling with the unevenness pattern 63 in a shape complementary to the unevenness pattern 63. For example, the main housing H may form a shape coupling with the unevenness pattern 63 in a complementary shape including a wedge shape formed between one of the first pair I1 of interfaces and one of the second pair I2 of interfaces in the second direction Z2, and another wedge shape formed between the other of the first pair I1 of interfaces and the other of the second pair I2 of interfaces in the second direction Z2.

Figure 14:
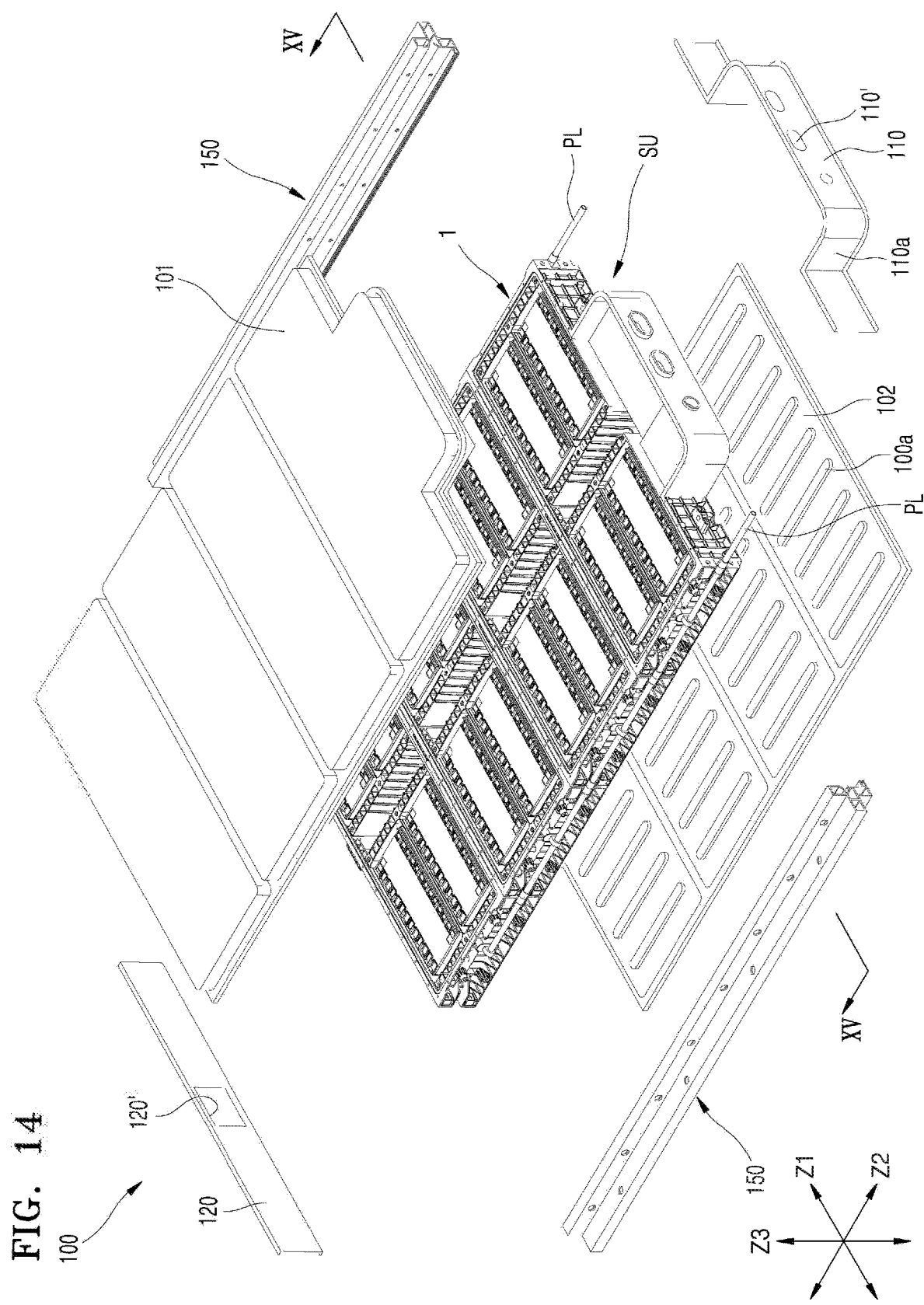
FIG. 14 illustrates a power supply device including the battery module shown in FIG. 1 according to some embodiments.
Figure 15:
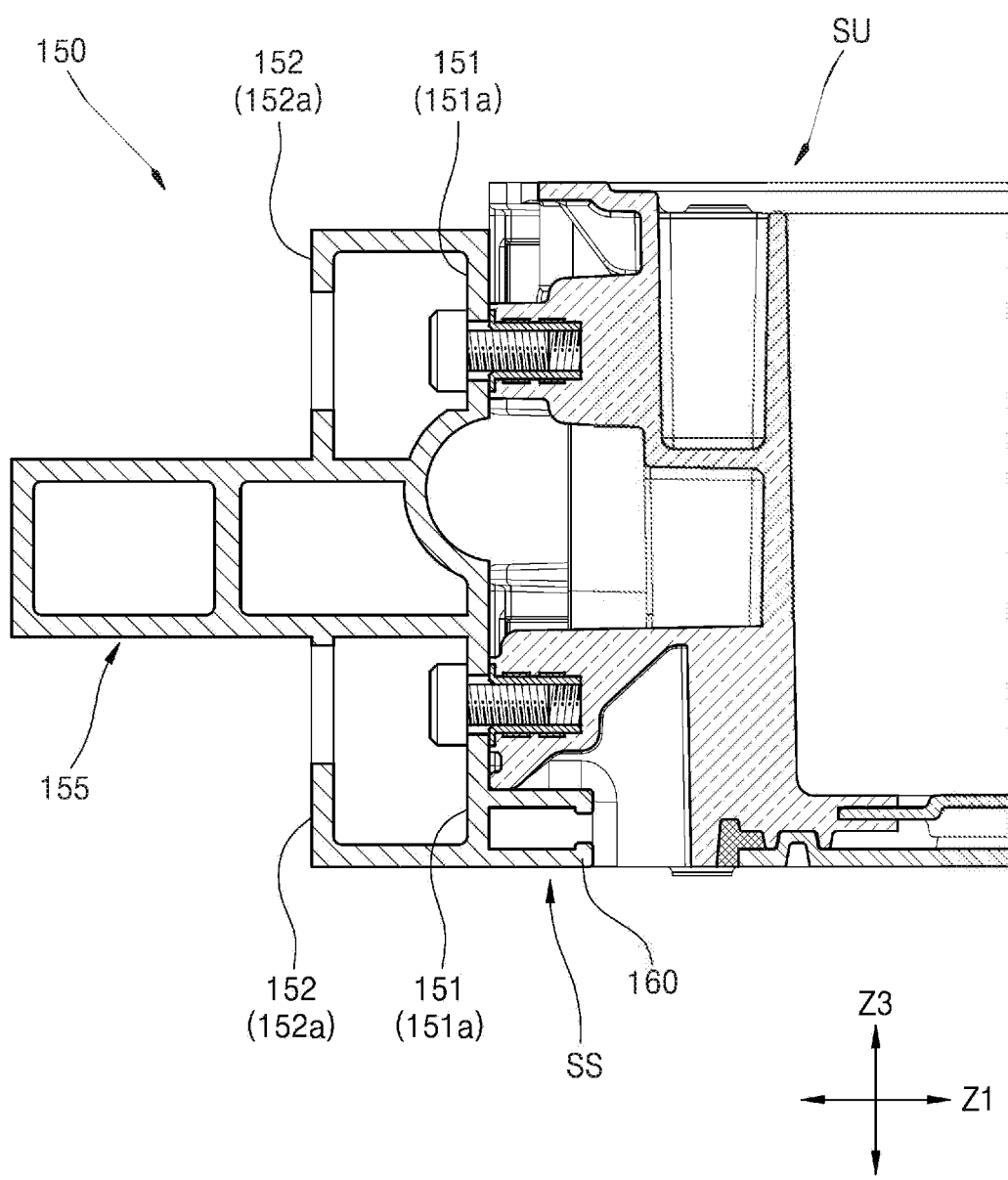
FIG. 15 is a cross-sectional view of a side reinforcement frame shown in FIG. 14, and illustrates a cross-sectional view taken along the line XV-XV of FIG. 14.
Figure 16:
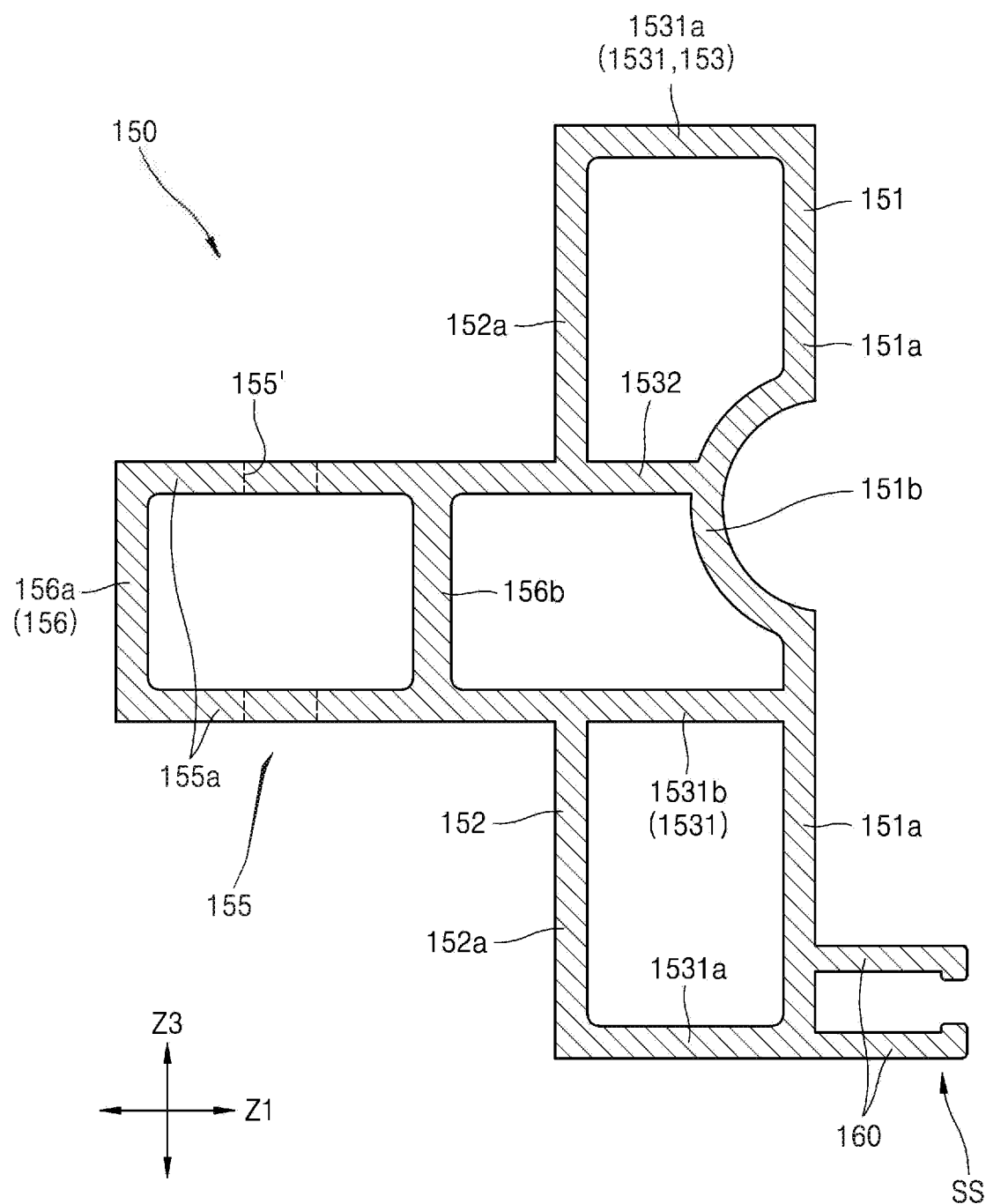
FIG. 16 is another cross-sectional view of the side reinforcement frame shown in FIG. 14.

FIG. 14 illustrates a power supply device 100 including the battery module shown in FIG. 1 according to some embodiments. FIG. 15 is a cross-sectional view of a side reinforcement frame shown in FIG. 14, and illustrates a cross-sectional view taken along the line XV-XV of FIG. 14. FIG. 16 is another cross-sectional view of the side reinforcement frame shown in FIG. 14.

Referring to FIGS. 14 to 16, the power supply device 100 may include a power supply unit SU and first and second metal plates 101 and 102 arranged on at least one side of the power supply unit SU. The power supply unit SU may include one or more battery modules 1 shown in FIG. 1, and according to some embodiments, the power supply unit SU may include a plurality of battery modules 1 arranged along the second direction Z2. According to some embodiments, the first and second metal plates 101 and 102 may be respectively arranged on the upper and lower surfaces of the power supply unit SU. In this case, the upper surface and the lower surface of the power supply unit SU may each denote a surface forming an upper portion of the power supply unit SU and a surface forming a lower portion of the power supply unit SU in the third direction Z3.

The first and second metal plates 101 and 102 may block electromagnetic noise radiated from the power supply unit SU and electromagnetic noise approaching the power supply unit SU, thereby preventing or reducing instances of a malfunction of the power supply device 100 and a malfunction of an apparatus on which the power supply device 100 is mounted. According to some embodiments, the first and second metal plates 101 and 102 may each include a steel material.

A plurality of beads 100a for absorbing impact may be formed on the first and second metal plates 101 and 102. For example, according to some embodiments, the plurality of beads 100a may be formed on at least one of the first or second metal plates 101 or 102, for example, on the second metal plate 102 that is arranged in a relatively downward position in the third direction Z3 and is capable of supporting the power supply unit SU. In this case, the beads 100a may be individually formed in units of the battery modules 1 provided in the power supply unit SU, and may be disconnected in units of the battery modules 1. The beads 100a formed on the first and second metal plates 101 and 102 may absorb an external impact in the third direction Z3 and absorb an internal impact applied to the battery modules 1. For example, the power supply device 100 according to some embodiments may be mounted in a vehicle as a driving power source of the vehicle, and may protect the battery modules 1 from an impact applied while the vehicle is driving. In this case, as the beads 100a formed on the first and second metal plates 101 and 102 are disconnected in units of the battery modules 1, the beads 100a may prevent or reduce an impact to a battery module 1 being transmitted to another battery module 1 adjacent to the battery module 1. For example, the beads 100a may be formed to have stripe shapes extending in the second direction Z2, and may be disconnected in units of the battery modules 1 in the second direction Z2. The beads 100a are intended to protect the battery modules 1, and may be formed on inner surfaces of the first and second metal plates 101 and 102 facing the battery modules 1.

According to some embodiments, the power supply device 100 may include a front reinforcing frame 110, a rear reinforcing frame 120, and a side reinforcing frame 150, arranged on each side connecting the upper surface of the power supply unit SU to the lower surface thereof. For example, the front reinforcing frame 110, the rear reinforcing frame 120, and the side reinforcing frame 150 may be arranged on the front, rear, and side surfaces of the power supply unit SU, respectively. The front, rear, and side reinforcing frames 110, 120, and 150 may each include a metal material, and may provide noise blocking together with the first and second metal plates 101 and 102. For example, the front, rear, and side reinforcing frames 110, 120, and 150 may include the same steel material as the first and second metal plates 101 and 102. In this case, the front surface and the rear surface of the power supply unit SU may respectively denote a surface forming the front of the power supply unit SU and a surface forming the rear of the power supply unit SU in the second direction Z2. In addition, the side surface of the power supply unit SU may denote a side surface that extends in the second direction Z2 and connects the front surface of the power supply unit SU to the rear surface of the power supply unit SU.

According to some embodiments, the front and rear surfaces of the power supply unit SU may correspond to a short side of the power supply unit SU or a long side of each of the battery module 1, and the side surface of the power supply unit SU may correspond to a long side of the power supply unit SU or a short side of each of the battery module 1. For example, according to some embodiments, the power supply unit SU may include a plurality of battery modules 1 arranged in the second direction Z2 so that long sides of the battery modules 1, which extend in the first direction Z1, face each other. Accordingly, the power supply unit SU may has a short side corresponding to long sides of the battery modules 1 extending in the first direction Z1, and a long side extending in the second direction Z2 in which the battery modules 1 are arranged. In other words, the long side of the power supply unit SU may correspond to the short side of each battery module 1, and the short side of the power supply unit SU may correspond to the long side of each battery module 1.

Herein, the front and rear surfaces of the power supply unit SU or the front and rear surfaces of the battery module 1 may each denote a short side forming both ends in a longitudinal direction of the power supply unit SU or a longitudinal direction of the battery module 1, and the side surface of the power supply unit SU or the side surface of the battery module 1 may denote a long side extending in the longitudinal direction of the power supply unit SU or the longitudinal direction of the battery module 1. Accordingly, the front reinforcement frame 110 and the rear reinforcement frame 120 respectively arranged on the front surface and the rear surface of the power supply unit SU, which correspond to the short side of the power supply unit SU, may be arranged on the side surface of battery module 1 corresponding to the long side of the battery module 1. In addition, the side reinforcement frame 150 arranged on the side surface of the power supply unit SU corresponding to the long side of the power supply unit SU may be arranged on the front surface and rear surface of battery module 1 corresponding to the short side of the battery module 1.

The front reinforcement frame 110 may include an accommodating portion protruding forward to accommodate a battery management system (BMS) arranged on the front side of the power supply unit SU, and accordingly, a bent portion 110a for forming the accommodation portion may be formed in the front reinforcement frame 110. In addition, a connection hole 110' for electrical connection with the BMS may be formed in the front reinforcement frame 110.

A vent hole 120' may be formed in the rear reinforcement frame 120. For example, the power supply device 100 according to some embodiments may be mounted in a vehicle as a driving power source of the vehicle, and the front and rear surfaces of the power supply device 100 may be arranged toward the front and rear surfaces of the vehicle, respectively. Accordingly, an exhaust gas exhausted through the vent hole 120' of the rear reinforcement frame 120 may be discharged to the outside through an exhaust pipe at the rear of the vehicle.

The front, rear, and side reinforcement frames 110, 120, and 150 may block electromagnetic noise together with the first and second metal plates 101 and 102, and may protect the power supply unit SU. For example, in the power supply device 100 mounted in a vehicle, an external impact applied toward the front and rear surfaces of the power supply device 100 may be absorbed to some extent through bumpers arranged on the front and rear of the vehicle, but an external impact applied toward the side surface of the power supply device 100 may not be absorbed. Therefore, it may be desirable to apply an impact mitigating structure to the power supply device 100 itself. Accordingly, in the power supply device 100 according to some embodiments, the side reinforcement frame 150 having a structure more reinforced than the front reinforcement frame 110 and the rear reinforcement frame 120 may be applied. For reference, the power supply device 100 according to some embodiments may be arranged in a vehicle such that the front, rear, and side surfaces of the power supply device 100 face the front, rear, and side surfaces of the vehicle, respectively, and accordingly, bumpers arranged on the front and rear sides of the power supply device 100 may alleviate external impacts applied toward the front and rear surfaces of the power supply device 100.

According to some embodiments, the front reinforcement frame 110 and the rear reinforcement frame 120 may each have the form of a metal strip, and the side reinforcement frame 150 is not formed at least in the form of a metal strip and may have a closed cross-section.

Referring to FIGS. 15 and 16, the side reinforcement frame 150 may include an inner frame 151 and an outer frame 152, which are arranged to face each other, and may have a closed cross-section while the inner frame 151 and the outer frame 152 are connected to each other through a connection bar 153. Accordingly, the side reinforcement frame 150 may provide better impact absorption than the front reinforcement frame 110 or the rear reinforcement frame 120.

Hereinafter, the side reinforcement frame 150 is described in more detail with reference to FIGS. 14 to 16.

Referring to FIGS. 14 to 16, the side reinforcement frame 150 may be arranged on the side surface of the power supply unit SU. For example, the side reinforcement frame 150 may be arranged in pairs on both side surfaces of the power supply unit SU facing each other in the first direction Z1. In this case, the side surface of the power supply unit SU on which the side reinforcement frame 150 is arranged may correspond to the long side of the power supply unit SU, and may correspond to the front and rear sides of battery module 1 corresponding to the short side of the battery module 1. That is, the side reinforcement frame 150 may extend across the front and rear surfaces of the plurality of battery modules 1 extending in the first direction Z1 and arranged in the second direction Z2.

The side reinforcement frame 150 according to some embodiments may surround a refrigerant pipe PL arranged on the side surface of the power supply unit SU. According to some embodiments, the side reinforcement frame 150 may partially surround the refrigerant pipe PL, and may surround a portion of a refrigerant pipe PL arranged on the opposite side to the power supply unit SU. For example, the refrigerant pipe PL may be connected to a cooling passage F provided in each of the battery modules 1. The refrigerant pipe PL may extend across a plurality of cooling passages F provided in the battery modules 1, and may supply a cooling medium to the plurality of cooling passages F or retrieve the cooling medium from the plurality of cooling passages F. For example, the refrigerant pipe PL may extend in the second direction Z2 in which the plurality of battery modules 1 are arranged, be branched in the first direction Z1 at a position corresponding to the cooling passage F provided in each battery module 1, and supply a cooling medium to the cooling passage F extending in the first direction Z1 corresponding to a longitudinal direction of each battery module 1 or retrieve the cooling medium from the cooling passage F.

The side reinforcement frame 150 may include an inner frame 151 arranged to face the side surface of the power supply unit SU, an outer frame 152 arranged opposite to the side surface of the power supply unit SU in the first direction Z1, and a connection bar 153 connecting the inner frame 151 to the outer frame 152. The inner frame 151 and the outer frame 152 may respectively include a flat portion 151a and a flat portion 152a, arranged in parallel with the side surface of the power supply unit SU, and a first connection bar 1531 may be arranged between the flat portion 151a of the inner frame 151 and the flat portion 152a of the outer frame 152. The first connection bar 1531 may connect the inner frame 151 to the outer frame 152 in the first direction Z1 and resist an external impact applied in the first direction Z1, that is, in the lateral direction. The first connection bar 1531 may include a first outer connection bar 1531a connecting the end of the inner frame 151 to the end of the outer frame 152 and forming a closed cross-section of the side reinforcement frame 150, and a first inner connection bar 1531b formed inside the closed cross-section of the side reinforcement frame 150.

The inner frame 151 may include a flat portion 151a extending parallel to the side surface of the power supply unit SU, and a curved portion 151b protruding roundly from the flat portion 151a in the first direction Z1 away from the side surface of the power supply unit SU. In this case, the flat portion 151a of the inner frame 151 may include two flat portions 151a apart from each other with the curved portion 151b therebetween in the third direction Z3, and the two flat portions 151a may provide a binding position for coupling between the side reinforcement frame 150 and the power supply unit SU.

The curved portion 151b of the inner frame 151 may be arranged between the flat portions 151a of the inner frame 151 in the third direction Z3. The curved portion 151b of the inner frame 151 may be formed to be rounded to surround the refrigerant pipe PL arranged on the side surface of the power supply unit SU, that is, may have an arc shape that follows a circular cross-section of the refrigerant pipe PL. According to some embodiments, the curved portion 151b of the inner frame 151 is not formed to be round to simply surround the refrigerant pipe PL having a circular cross-section, and may prevent or reduce local stress concentration against external impacts and may prevent or reduce damage to the inner frame 151 due to local stress concentration by smoothly transferring stress through the rounded curved portion 151b. That is, according to some embodiments, the curved portion 151b surrounding the refrigerant pipe PL may be formed to be round, and may not include at least a portion bent at an angle.

The refrigerant pipe PL has a structure for supplying a cooling medium to the cooling passage F provided in each of the battery modules 1 or retrieving a cooling medium discharged from the cooling passage F, and may be provided in the form of a pipe having a circular cross-section. The refrigerant pipe PL may extend across the plurality of battery modules 1 arranged in the second direction Z2, and supply a low-temperature cooling medium in parallel to the plurality of battery modules 1 or retrieve a high-temperature cooling medium. The cooling passage F provided in each of the battery module 1 is the same as described above, and thus, some redundant descriptions thereof may be omitted.

A second connection bar 1532 may be formed between the curved portion 151b of the inner frame 151 and the flat portion 152a of the outer frame 152. According to some embodiments, the second connection bar 1532 may be connected to a convex apex protruding farthest in the first direction Z1 in the curved portion 151b of the inner frame 151. According to some embodiments, the second connection bar 1532 is intended to resist an external impact applied in the first direction Z1, and an impact of the outer frame 152 may be transmitted to the inner frame 151 through the second connection bar 1532. In this case, as the external impact is transmitted to the convex apex of the inner frame 151 through the second connection bar 1532, stress transmission to both sides of the curved portion 151b connected to the convex apex may be smoothly and balanced through the convex apex. When the connection position of the second connection bar 153 is formed at a different position of the curved portion 151b rather than the convex apex of the curved portion 151b, stress transmitted through the second connection bar 1532 may be transmitted biasedly to one side, thereby causing imbalance of stress and local concentration of stress.

The outer frame 152 may include a flat portion 152a extending parallel to the side surface of the power supply unit SU, and a protrusion 155 protruding from the flat portion 152a in the first direction Z1 away from the side surface of the power supply unit SU. According to some embodiments, the protrusion 155 may provide a binding position with respect to a mounting plate that provides a support base for the power supply device 100. For example, the protrusion 155 may include a pair of protrusion pieces 155a extending in parallel in the first direction Z1, and a connection piece 156 extending in the third direction Z3 intersecting with the first direction Z1 and connecting the pair of protrusion pieces 155a to each other. According to some embodiments, the pair of protrusion pieces 155a may extend in parallel in the first direction Z1 from the first and second connection bars 1531 and 1532, respectively. For example, an external impact applied in the first direction Z1 may be first transmitted to the protrusion 155 protruding in the first direction Z1, and may be transmitted to the inner frame 151 through the pair of protrusion pieces 155*a* forming the protrusion 155 and the first and second connection bars 1531 and 1532 connected in a straight line to the pair of protrusion piece 155*a*. In a process in which the external impact is transmitted to each of the flat portion 151*a* and the curved portion 151*b* of the inner frame 151, the external impact may be absorbed through the pair of protrusion pieces 155*a* extending in the first direction Z1, or the first and second connection bars 1531 and 1532 connected in a straight line to the pair of protrusion pieces 155*a*. For example, the external impact applied along the first direction Z1 may be transmitted to the power supply unit SU in the form of being dispersed in several places while propagating from the pair of protrusion pieces 155*a* to four first and second connection bars 1531 and 1532, and may be transmitted to a plurality of places in the third direction Z3 to thereby alleviate an impact to the power supply unit SU.

The protrusion 155 may provide a binding position with respect to a mounting plate forming a support base of the power supply device 100. For example, the position of the protrusion 155 may be fixed with respect to the mounting plate through a fastening member fitted into a fastening hole 155' formed at positions corresponding to each other in the pair of protrusion pieces 155*a*, and the position of the power supply device 100 may be fixed through the protrusion 155.

The pair of protrusion pieces 155*a* may be supported with respect to each other through the connection piece 156, and the connection piece 156 may include an outer connection piece 156*a* connecting the ends of the pair of protrusion pieces 155*a* to form a closed cross-section of the side reinforcement frame 150, and an inner connection piece 156*b* formed inside the closed cross-section of the side reinforcement frame 150. In this case, the fastening hole 155' into which a fastening member is fitted may be formed between the outer connection piece 156*a* and the inner connection piece 156*b*.

The connection piece 156 may extend in the third direction Z3 along a fastening direction of the fastening member fitted into the protrusion 155, and may support the pair of protrusion pieces 155*a* from each other at regular intervals in the third direction Z3, thereby resisting a fastening force applied in the fastening direction and preventing or reducing damage to the protrusion 155.

The protrusion 155 may be formed between flat portions 152*a* formed at both sides of the outer frame 152 in the third direction Z3. The protrusion 155 may provide a binding position with a mounting plate in a position elevated from the mounting plate that provides a support base for the power supply device 100 in the third direction Z3. Accordingly, the binding force with the mounting plate may not be affected by the deformation or shape of the protrusion 155.

According to some embodiments, in the lower surface of the power supply unit SU, a step space SS drawn in the first direction Z1 from the side surface of the power supply unit SU may be formed. In addition, the side reinforcement frame 150 may be connected to an extension frame 160 arranged in the step space SS. The step space SS may be formed while a portion of the lower surface connected to the side surface of the power supply unit SU is drawn in the first direction Z1 from the side surface of the power supply unit SU. According to some embodiments, the extension frame 160, together with the inner frame 151, may surround a corner where the side and lower surfaces of the power supply device 100 are in contact with each other. The extension frame 160 may include a pair of extension frames 160 extending in parallel in the first direction Z1, and the pair of extension frames 160 may include one ends connected to each other through the inner frame 151 (i.e., the flat portion 151*a*) and other ends formed in open forms. That is, the extension frame 160, unlike the side reinforcement frame 150, may be formed in an open form, and thus, the tolerance of the step space SS may be provided through the extension frame 160 formed in the open form, and an external impact in the third direction Z3 may be more effectively absorbed. The side reinforcement frame 150 may be formed to have a closed cross-section through the first outer connection bar 1531*a* connecting the inner frame 151 to the outer frame 152 and the outer connection piece connecting the pair of protrusion pieces 155*a* to each other.

According to some embodiments of the present disclosure, a power supply device may have relatively improved impact resistance against external impacts and may have relatively lower weight by using a module housing including a composite material.

It should be understood that embodiments described herein should be considered in a descriptive sense only and not for purposes of limitation. Descriptions of features or aspects within each embodiment should typically be considered as available for other similar features or aspects in other embodiments. While aspects of one or more embodiments have been described with reference to the figures, it will be understood by those of ordinary skill in the art that various changes in form and details may be made therein without departing from the spirit and scope of the disclosure as defined by the following claims, and their equivalents.

What is claimed is:

1. A power supply device comprising:
    a power supply unit including at least one battery module having terminals at a top side of the power supply unit that is opposite a bottom side of the power supply unit; and
    a side reinforcement frame on a side surface of the power supply unit and surrounding a refrigerant pipe installed in a cavity with a curved surface in the side reinforcement frame, the refrigerant pipe being connected to a cooling passage at a bottom side of the at least one battery module that is adjacent to the side surface of the power supply unit and opposite to the top side of the power supply unit,
    wherein the at least one battery module includes:
    at least one cell assembly;
    a main housing including a main rim portion surrounding an accommodation space in which the at least one cell assembly is positioned;
    a first plate including a first rim portion coupled to the main rim portion and a first exposed portion exposed from the main rim portion and defining one side of the cooling passage for cooling the accommodation space, the first rim portion having upper, lower, and side surfaces, which are respectively surrounded by a recessed holding portion of the main rim portion; and
    a second plate facing the first plate and including a second rim portion coupled to the main rim portion and a second exposed portion exposed from the main rim portion and defining an other side of the cooling passage.

2. The power supply device of claim 1, wherein
    the power supply unit includes a plurality of battery modules each extending in a first direction and arranged in a second direction, and the side reinforcement frame extends across front and rear surfaces of the plurality of battery modules arranged in the second direction.

3. The power supply device of claim 2, wherein the cooling passage extends in the first direction in which the front surfaces of the plurality of battery modules face the rear surfaces of the plurality of battery modules.

4. The power supply device of claim 3, wherein the refrigerant pipe extends in the second direction, is branched in the first direction, and is configured to supply a cooling medium to a plurality of cooling passages or to retrieve the cooling medium from the plurality of cooling passages.

5. The power supply device of claim 2, wherein the side reinforcement frame includes:
an inner frame facing the side surface of the power supply unit;
an outer frame opposite to the side surface of the power supply unit in the first direction; and
a connection bar connecting the inner frame to the outer frame.

6. The power supply device of claim 5, wherein each of the inner frame and the outer frame includes a flat portion arranged parallel to the side surface of the power supply unit.

7. The power supply device of claim 6, wherein the connection bar includes a first connection bar extending between the flat portion of the inner frame and the flat portion of the outer frame.

8. The power supply device of claim 7, wherein the first connection bar includes:
a first outer connection bar connecting an end of the inner frame to an end of the outer frame and forming a closed cross-section of the side reinforcement frame; and
a first inner connection bar formed inside the closed cross-section of the side reinforcement frame.

9. The power supply device of claim 5, wherein the inner frame includes a flat portion extending parallel to the side surface of the power supply unit, and a curved portion protruding roundly from the flat portion in the first direction away from the side surface of the power supply unit.

10. The power supply device of claim 9, wherein the curved portion surrounds the refrigerant pipe formed on the side surface of the power supply unit.

11. The power supply device of claim 9, wherein the curved portion is between flat portions formed on both sides of the curved portion in a third direction intersecting with the first direction.

12. The power supply device of claim 11, wherein the flat portions formed on both sides of the curved portion provide a binding position for coupling between the side reinforcement frame and the power supply unit.

13. The power supply device of claim 5, wherein the connection bar includes a second connection bar extending between a curved portion of the inner frame and a flat portion of the outer frame.

14. The power supply device of claim 13, wherein the second connection bar is connected to a convex apex farthest from the side surface of the power supply unit in the first direction in the curved portion of the inner frame.

15. The power supply device of claim 5, wherein the outer frame includes a flat portion extending parallel to the side surface of the power supply unit, and a protrusion protruding from the flat portion in the first direction away from the side surface of the power supply unit.

16. The power supply device of claim 15, wherein the protrusion is formed between flat portions formed at both sides of the outer frame in a third direction intersecting with the first direction.

17. The power supply device of claim 15, wherein the protrusion includes a pair of protrusion pieces extending in parallel in the first direction, and a connection piece extending in a third direction intersecting with the first direction and connecting the pair of protrusion pieces to each other.

18. The power supply device of claim 17, wherein the connection piece includes:
an outer connection piece connecting ends of the pair of protrusion pieces to each other to form a closed cross-section of the side reinforcement frame; and
an inner connection piece formed inside the closed cross-section of the side reinforcement frame.

19. The power supply device of claim 18, wherein a fastening hole is formed in a pair of protrusion pieces, which are formed between the outer connection piece and the inner connection piece, in the third direction intersecting with the first direction.

* * * * *